US007346581B2

(12) United States Patent
Yamanaka

(10) Patent No.: US 7,346,581 B2
(45) Date of Patent: *Mar. 18, 2008

(54) COPYRIGHT MANAGEMENT APPARATUS, COPYRIGHTED-WORK DISTRIBUTION APPARATUS, AND COPYRIGHTED-WORK DISTRIBUTION AND RECEIVING SYSTEM

(75) Inventor: Yasuhiro Yamanaka, Chiba (JP)

(73) Assignee: Sony Corporation (JP)

( * ) Notice: Subject to any disclaimer, the term of this patent is extended or adjusted under 35 U.S.C. 154(b) by 516 days.

This patent is subject to a terminal disclaimer.

(21) Appl. No.: 11/082,549

(22) Filed: Mar. 17, 2005

(65) Prior Publication Data

US 2005/0166056 A1    Jul. 28, 2005

Related U.S. Application Data

(63) Continuation of application No. 09/354,608, filed on Jul. 16, 1999, now Pat. No. 6,928,423.

(30) Foreign Application Priority Data

Jul. 17, 1998   (JP) .............................. P-10-204005

(51) Int. Cl.
*H04L 9/00* (2006.01)
*H04K 1/00* (2006.01)

(52) U.S. Cl. ........................ 705/50; 705/51; 705/52; 705/53; 705/54; 705/56; 705/58; 380/262; 380/277; 709/201; 713/1; 725/2

(58) Field of Classification Search ............ 705/51–59; 380/262, 277; 713/1; 709/201; 725/2
See application file for complete search history.

(56) References Cited

U.S. PATENT DOCUMENTS 5,247,575 A    9/1993  Sprague et al.

(Continued)

FOREIGN PATENT DOCUMENTS

EP         1 467 566 A2    10/2004

(Continued)

OTHER PUBLICATIONS

William Souder, "Special Effects: in marketing battle with giant competitions, Hudepohl Brewing Co. has found that special events can give it an edge", Oct. 1984, Inc. Magazine, V6, p. 161.

(Continued)

*Primary Examiner*—Bradley B. Bayat
(74) *Attorney, Agent, or Firm*—Lerner, David, Littenberg, Krumholz & Mentlik, LLP

(57) ABSTRACT

A TV music broadcasting program is distributed from a distribution apparatus through a ground station and a satellite, and a musical-piece program is also distributed through a plurality of audio channels. A subscriber looks for the desired musical piece from a musical-piece list displayed on the screen of a TV receiver and downloads it into a storage device. A pay-per-view method is employed in which accounting is performed in units of musical pieces. At downloading, a purchase record is stored in an IC card placed in a receiving apparatus and it is periodically sent to a customer management center. The customer management center calculates the viewing fee and issues a bill to the subscriber. A copyright management apparatus in the distribution apparatus obtains the purchase record of a musical piece from the customer management center to calculate a copyright fee to be paid to the copyright holder.

1 Claim, 13 Drawing Sheets

U.S. PATENT DOCUMENTS

| | | |
|---|---|---|
| 5,715,403 A | 2/1998 | Stefik |
| 5,963,915 A | 10/1999 | Kirsch |
| 5,999,622 A | 12/1999 | Yasukawa et al. |
| 6,002,772 A | 12/1999 | Saito |
| 6,209,787 B1 | 4/2001 | Iida |
| 6,388,714 B1 | 5/2002 | Schein et al. |
| 2001/0032187 A1 | 10/2001 | Nuttall |
| 2002/0029380 A1 | 3/2002 | Matsumoto et al. |

OTHER PUBLICATIONS

S. Izumikawa, "Audio multiplex and character multiplex technology.l", AEU Journal 111, IEEE, p. 97-101.

FIG. 9

| CLUSTER | SECTOR FF 0 0 ··· ···1F |
|---|---|
| 0<br>1 | BUFFER AREA |
| 2 | Power Calibration Area |
| 3<br>4<br>5 | User Table Of Contents |
| 6 | BUFFER AREA |
| 7<br>8 | Aux TOC |
| 9<br>10 | BUFFER AREA |
| 11<br>⋮<br>48 | Aux Date<br>2.8Mbyte (Mode 2) |
| 49 | BUFFER AREA |
| 50<br>⋮<br>⋮<br>2251 | Sub Data \| Main Data (CURRENT ATRAC)<br>74 MINUTES<br>AT MAXIMUM |

JPEG STILL PICTURE
LYRICS INFORMATION
VARIOUS TEXT INFORMATION

COPYRIGHT MANAGEMENT APPARATUS, COPYRIGHTED-WORK DISTRIBUTION APPARATUS, AND COPYRIGHTED-WORK DISTRIBUTION AND RECEIVING SYSTEM

CROSS-REFERENCE TO RELATED APPLICATIONS

This application is a continuation of U.S. application Ser. No. 09/354,608 filed Jul. 16, 1999, now U.S. Pat. No. 6,928,423 the entire disclosure of which is hereby incorporated herein by reference.

BACKGROUND OF THE INVENTION

1. Field of the Invention

The present invention relates to a copyrighted-work distribution-and-receiving system in which data is generated from the contents of copyrighted work and distributed through a given transmission path, and a receiving fee is imposed on a receiving side in units of received contents; a copyright management apparatus used in such a system for performing management of copyright related to copyrighted work; and a copyrighted-work distribution apparatus having a copyright management function.

2. Description of the Related Art

Digital satellite broadcasting has become widespread. Compared with analog broadcasting, digital satellite broadcasting is immune to noise and fading, and allows high-quality signal transmission. In addition, the bandwidth efficiency has been improved and multiple channels can be used. In digital satellite broadcasting, for example, one satellite can provide several hundred channels. In such digital satellite broadcasting, a number of special channels have been provided, such as a sport channel, a movie channel, a music channel, and a news channel. In these special channels, programs having corresponding special contents are broadcasted.

Among these special channels, a music channel is popular in which promotion programs, such as those introducing new songs and hit songs, are mainly broadcasted.

As described above, programs for new-song introduction and hit songs are transmitted with a moving picture and sound in a conventional music channel. When an audience finds a favorite musical piece in the music channel, the audience may consider buying a CD of the musical piece being introduced. Alternatively, the audience may want to obtain information on an artist playing the musical piece and information of an album including the musical piece. It would be very convenient if, while the audience is viewing a music program, the audience could obtain information on the artist and the album including the musical piece, or if the audience could download the audio data of a musical piece which they like. Since the moving picture and the sound of a musical piece are transmitted only one way in the conventional music channel, such a demand cannot be satisfied.

To solve this drawback, a musical-contents distribution system has been proposed (Japanese patent application No. Hei-9-308488) in which information related to music broadcasted in a music channel can be easily obtained, and musical-piece data can be easily downloaded to a data storage apparatus.

A so-called FLAT accounting method for a music broadcasting channel is known. In this method, when the user pays a flat monthly charge, the user can watch a plurality of music broadcasting channels.

In the above accounting method, however, if a flat monthly change is paid, all broadcasted musical pieces can be recorded into a digital recording medium such as a Mini Disc (MD) any number of times. If this case occurs, since a distribution business party cannot determine which musical piece is recorded by the audience, the party cannot pay an appropriate copyright fee to the copyright holder of the musical piece, which is copyrighted work. Therefore, copyright may be insufficiently protected.

Such a problem occurs not only in a system that distributes musical contents but also in a video-contents distribution system and further in a system that widely distributes copyrighted work, such as a character-and-image-information distribution system like a so-called electronic library.

SUMMARY OF THE INVENTION

Accordingly, it is an object of the present invention to provide a copyright management apparatus, a copyrighted-work distribution apparatus, and a copyrighted-work distribution and receiving system which allow an appropriate copyright fee, corresponding to the conditions of use of copyrighted work, to be paid to the copyright holder when copyrighted work is converted to data and distributed and a fee is imposed on a receiver in copyrighted-work units.

The foregoing object is achieved in one aspect of the present invention through the provision of a copyright management apparatus used for a copyrighted-work distribution-and-receiving system in which a distribution side generates data from the contents of copyrighted work and distributes the data through a given transmission path, and a receiving side pays a receiving fee for the contents received in a usable form in units of the contents. The apparatus includes copyright information storage means for storing copyright information related to the copyright of the copyrighted work, including the contents, for all the contents to be distributed; receiving means for receiving received-contents-specifying information, sent from the receiving side, for specifying the contents to be distributed by the distribution side and received by the receiving side; and copyright management means for performing management related to the copyright of each copyrighted work by referring to the copyright information storage means according to the received-contents-specifying information received by the receiving means.

"Receiving in a usable form" does not only mean that the contents of copyrighted work reach the receiving side, but means processing that includes recording the received contents into a recording medium in a reproducible form and transmitting the received contents in a usable form. "Use" refers to all actions related to the copyright of copyrighted work.

The foregoing object is achieved in another aspect of the present invention through the provision of a copyrighted-work distribution apparatus used for a copyrighted-work distribution-and-receiving system having the above structure, including contents distribution means for distributing the contents through the transmission path; copyright information storage means for storing copyright information related to the copyright of the copyrighted work, including the contents, for all the contents; receiving means for receiving received-contents-specifying information, sent from the receiving side, for specifying the contents to be distributed from the contents distribution means and received by the receiving side; and copyright management means for performing management related to the copyright of each copyrighted work by referring to the copyright information storage means according to the received-contents-specifying information received by the receiving means.

The foregoing object is achieved in yet another aspect of the present invention through the provision of a copyrighted-work distribution-and-receiving system having the above structure, including contents distribution means for distributing all contents through the transmission path; copyright information storage means for storing copyright information related to the copyright of copyrighted work, including the contents, for all the contents; a receiving-side apparatus for receiving the contents distributed from the contents distribution means and for sending received-contents-specifying information for specifying the received contents; receiving means for receiving the received-contents-specifying information sent from the receiving-side apparatus; and copyright management means for performing management related to the copyright of each copyrighted work by referring to the copyright information storage means according to the received-contents-specifying information received by the receiving means. A "system" refers to a body in which a plurality of apparatuses logically gather. It does not matter whether the apparatuses are disposed in one cabinet or not.

In a copyright management apparatus, a copyrighted-work distribution apparatus, or a copyrighted-work distribution-and-receiving system according to the present invention, when the receiving side which has received the contents distributed from the distribution side sends the received-contents-specifying information, the distribution side receives it, the copyright management means refers to the copyright-information storage means according to the received-contents-specifying information, and management related to the copyright of each copyrighted work is performed. Therefore, even in a system that performs accounting by the pay-per-view method in which accounting is performed for the contents, the distribution business party can accurately determine the condition of use of the distributed copyrighted work and appropriately perform management of the copyright of the copyrighted work.

When the copyright management means searches the distribution-service-identifying-information database according to the distribution-service-identifying information serving as the received received-contents-specifying information to obtain the corresponding contents-identifying information; and refers to the copyright information database according to the obtained contents-identifying information to obtain the copyright information of the corresponding copyrighted work; and calculates a copyright fee to be paid for the use of the copyrighted work according to the obtained copyright information, a copyright fee is appropriately paid to the copyright holder.

When the received-contents-specifying information is sent from the receiving side that has received the contents, through the predetermined customer management center, the receiving side needs to be connected to the customer management center only. Therefore, even when the copyright management function of the present invention is added to an existing copyrighted-work distribution-and-receiving system, an existing receiving facility at a subscriber's house, at the receiving side, does not need to be modified at all and the distribution business party only needs to newly install a copyright management means and to connect it to the customer management center. Therefore, according to the present invention, the system can be changed without imposing any loads on the audience.

When the distribution side can receive even customer information related to the customer at the receiving side, market-trend research can be performed in real time.

When the contents are enciphered and distributed, unauthorized use is prevented and system reliability is assured.

BRIEF DESCRIPTION OF THE DRAWINGS

FIG. 9 is a view showing an example of a recording format used in the storage device shown in FIG. 1.

DESCRIPTION OF THE PREFERRED EMBODIMENT

Figure 1:
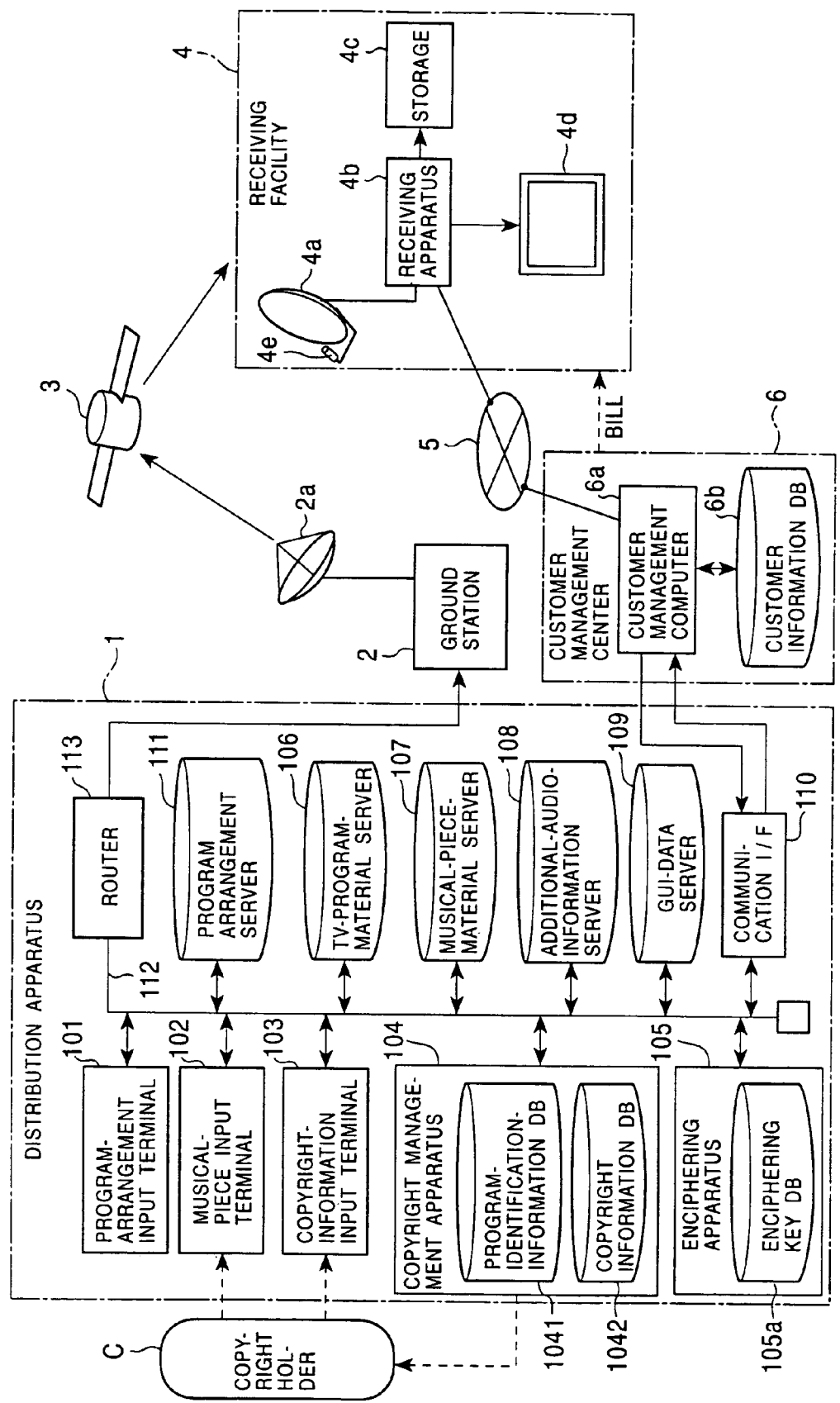
FIG. 1 is a block diagram showing the whole structure of a copyrighted-work distribution-and-receiving system serving as a musical-piece distribution-and-receiving system according to an embodiment of the present invention.

An embodiment of the present invention will be described below in detail by referring to the drawings.

FIG. 1 shows the whole structure of a musical-piece distribution-and-receiving system that serves as a copyrighted-work distribution-and-receiving system according to an embodiment of the present invention. This system broadcasts a music program with the use of digital satellite broadcasting and distributes audio data related to the music program to allow an audience to watch the music program. In addition, the system employs an impulse pay per view (IPPV) method in which, if the audience finds a favorite musical piece, the audience can easily purchase the musical piece after viewing the program. The user later pays the viewing charge for the program. In the present embodiment, this method means that the user pays the charge corresponding to the amount of musical pieces downloaded (recorded into a recording medium) from a distribution apparatus 1. In the following description, a musical piece regarded as copyrighted work to be distributed is also referred to as "contents."

As shown in FIG. 1, this musical-piece distribution-and-receiving system includes the distribution apparatus 1 for distributing television (TV) programs and various musical pieces, a ground station 2 for transmitting materials received from the distribution apparatus 1, such as the TV programs and musical pieces, from an antenna 2a toward a satellite 3 with radio waves, a receiving facility 4 provided at the house of a subscriber of this system for receiving radio waves sent from the satellite 3, and a customer management center 6 which can be connected to the receiving facility 4 through a telephone line 5 and can also be connected to the distribution apparatus 1 through a special line. The "subscriber" refers to an audience who has subscribed to the musical-piece distribution-and-receiving system, and is also called a customer or a user as required in the following descriptions.

The distribution apparatus 1 is provided with a program-arrangement input terminal 101, a musical-piece input terminal 102, a copyright-information input terminal 103, a copyright management apparatus 104, an enciphering apparatus 105, a television-program-material server 106, a musical-piece-material server 107, an additional-audio-information server 108, a graphical user interface (GUI) data server 109, a communication interface (I/F) apparatus 110, and a program-arrangement server 111. These apparatuses are connected to each other with a local area network (LAN) 112. This LAN 112 is connected to the ground station 2 through a router 113.

The program-arrangement input terminal 101 is used for inputting program-arrangement information to arrange a program to be broadcasted. The program-arrangement information includes the title of a TV program, an event ID serving as identification information unique to a program, a broadcasting time, the titles of a plurality of musical pieces to be distributed in parallel to the TV program, a service ID indicating the sub-channel (audio channel) assignment of each of these musical pieces, and musical-piece-accompaniment information which is accompanied by each of the musical pieces. The musical-piece-accompaniment information includes the artist who plays (or sings) a musical piece, a songwriter, a musical composer, a still picture on the jacket of a recording medium such as a compact disc (CD) in which the musical piece is recorded, a CD release date, and concert information related to the artist. The input program-arrangement information described above is stored in the program-arrangement server 111. Some items included in the input program-arrangement information are stored in a program-identification-information database (DB) 1041 of the copyright management apparatus 104 as program-identification information described later.

The musical-piece input terminal 102 is used for inputting into the distribution apparatus 1 a musical piece recorded in a recording medium, such as a CD, offered by the copyright holder. The input musical piece is stored in the musical-piece-material server 107. A musical piece recorded in a CD is usually handled as copyrighted work. Since it is protected by copyright, it is necessary to pay a consideration for its use to the songwriter or the musical composer, who is a copyright holder, or a record company which has the copyright. Especially in a system in which a subscriber pays a receiving fee to a distribution business party by the IPPV method, such as the musical-piece distribution-and-recording system in the present embodiment, it is necessary for each subscriber to pay the copyright fee corresponding to the frequency of receiving (more specifically, downloading a musical piece), and therefore management of the receiving status of each subscriber is important.

The copyright-information input terminal 103 is used for inputting information (hereinafter called copyright information) related to the copyright obtained from the copyright holder. The input copyright information is stored in a copyright-information database (DB) 1042 of the copyright management apparatus 104, as described later. The copyright information includes a contents ID serving as unique musical-piece identification information assigned to each musical piece, the name of the copyright holder, the name of the neighboring-right holder (the songwriter or the musical composer, who is a copyright holder, or a record company which has the copyright), a sales price (a fee which the distribution business party obtains from a subscriber for each downloading of a musical piece), and a copyright fee ratio (the ratio of the copyright fee to the sales price).

The copyright management apparatus 104 manages the copyright of a distributed musical piece. It especially performs various types of processing which enables a copyright fee appropriate for the amount of use of a musical piece (more specifically, the number of times a subscriber downloads the musical piece) to be paid to the copyright holder. A detailed structure of the copyright management apparatus 104 will be described later.

The enciphering apparatus 105 enciphers the individual information of each subscriber and a key (a work key Kw described later) for deciphering (descrambling) required at a receiving side for deciphering a musical piece enciphered by scrambling processing and distributed, as described later. The individual information is sent from a customer-information database 6b, described later, of the customer management center 6. It includes an IC-card ID serving as the identification number unique to an IC card, the number of the work key Kw used for deciphering a musical piece received by a receiving apparatus 4b of the receiving facility 4 at a subscriber's house, and contract information indicating the contents of the receiving contract which the distribution business party makes with each subscriber, all of which are assigned to each subscriber by the distribution business party at subscription. The contract information includes a contract service ID indicating a channel for which a viewing contract is made, a contract event ID indicating a program for which the viewing contract is made, a contract type indicating whether the desired musical piece can be downloaded, a program purchase upper limit, described later, a calling designation date, described later, and a calling designation fee, described later. The IC card is used with the receiving apparatus 4b, described later, of the receiving facility 4 at a subscriber's house, and is required to download a distributed musical piece.

The enciphering apparatus 105 is provided with an enciphering-key database 105a. This enciphering-key database 105a stores an individual key Km serving as an enciphering key for enciphering the individual information of a subscriber and a work key Kw serving as an enciphering key for enciphering program identification information. A different enciphering key is given to each subscriber as an individual key Km. The number of individual keys is equal to the number of subscribers.

The TV-program-material server 106 sends materials used in a usual TV music broadcasting program. The TV-program materials stored in the TV-program-material server 106 include moving pictures (video) and sound (audio), such as sound with a moving picture for the promotion of a new-song introduction and a ranking chart of the latest hit songs.

The musical-piece-material server 107 stores the musical piece input from the musical-piece input terminal 102, and sends an audio program to the ground station 2 through an audio channel. The material of the audio program only includes sound (musical piece). The musical-piece-material server 107 can send the materials of audio programs in a plurality of audio channels to the ground station 2. As described later, in program broadcasting in each audio channel, a musical piece is repeatedly broadcasted for a given unit time period. Each audio channel is independent and various methods of use can be considered. In one method of use, for example, a recommended song among the latest Japanese pop songs is repeatedly broadcasted for a given time period in one audio channel, whereas in another audio channel a recommended song among the latest American pop songs is repeatedly broadcasted for a given time period, and further, in still another channel, a recommended jazz song is repeatedly broadcasted for a given time period. In several audio channels, a plurality of musical pieces of the same artist may be repeatedly broadcasted.

The additional-audio-information server 108 sends time information of a musical piece output from the musical-piece-material server 107. Specifically, this time information indicates the total performance time of a musical piece and the elapsed time from the start of the performance of the musical piece.

The GUI data server 109 sends data for creating a list page of distributed musical pieces and an information-page screen for each musical piece, data for creating the still-picture data of the jacket of a CD that stores a musical piece, and musical-piece-accompaniment information such as data for creating a screen for an electric program guide (EPG). As described later in detail, in the musical-piece distribution-and-receiving system in the present embodiment, GUI operations on the screen of a TV receiver 4d in the receiving facility 4 at a subscriber's house allow, for example, an information page which includes the lyrics of a distributed musical piece and concert information of an artist to be displayed on the screen and a musical piece to be selected, downloaded, and reserved. The GUI data server 109 sends the musical-piece-accompaniment information required for such processing to the ground station 2 together with other information. Such musical-piece-accompaniment information is generated, for example, with the use of a multimedia and hypermedia information coding experts group (MHEG) method.

The communication I/F apparatus 110 is used for connecting each apparatus in the distribution apparatus to the customer management computer 6a in the customer management center 6. With the communication I/F apparatus 110, bidirectional communication is allowed between each apparatus in the distribution apparatus 1 and the customer management computer 6a in the customer management center 6. The router 113 is used for connecting the LAN 112 in the distribution apparatus 1 and a LAN (not shown) in the ground station 2.

The structure of the copyright management apparatus 104 will be described in detail.

Figure 2:
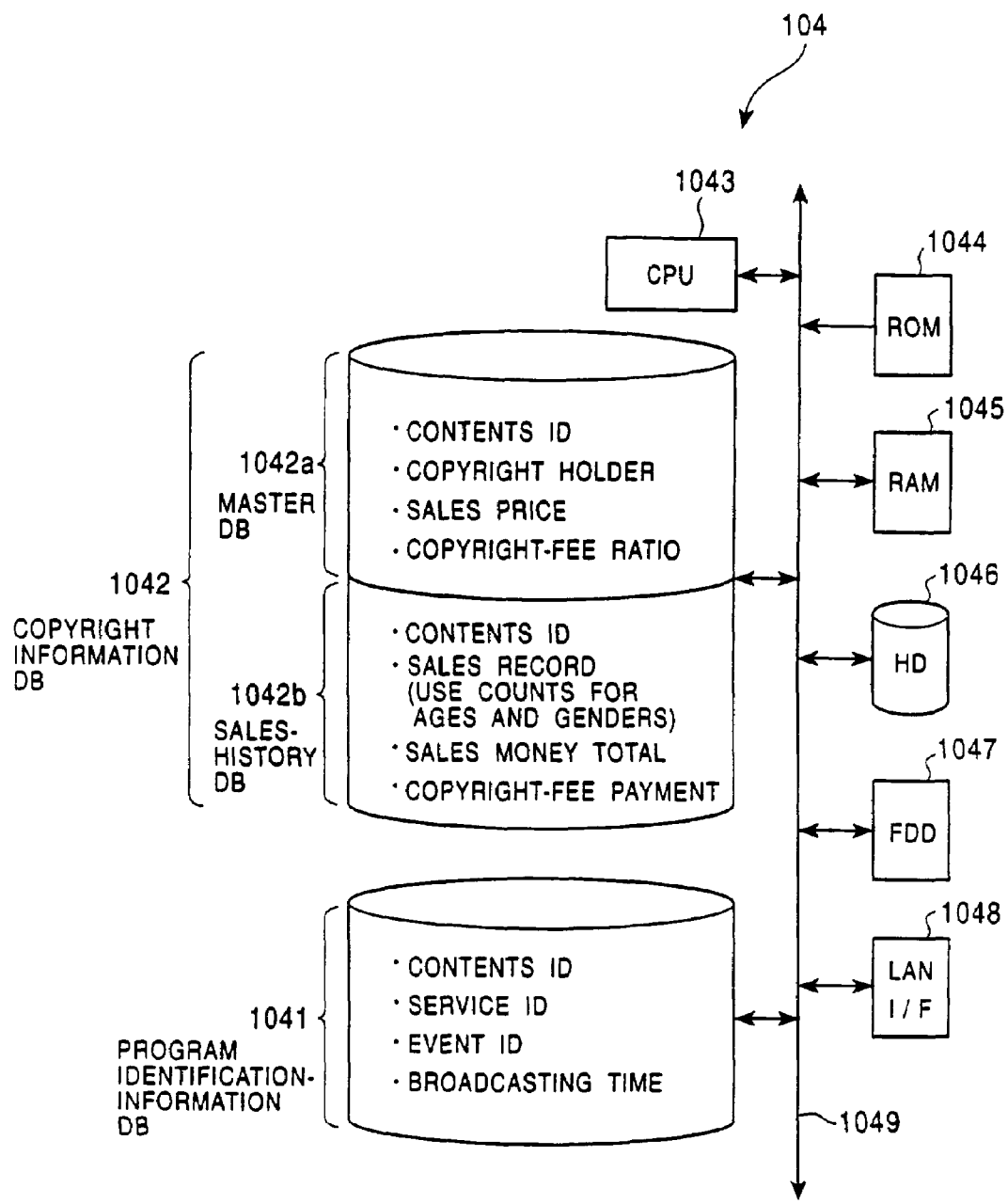
FIG. 2 is a block diagram showing the structure of a copyright management apparatus in a distribution apparatus shown in FIG. 1.

FIG. 2 shows a structure of the copyright management apparatus 104 shown in FIG. 1. As shown in this figure, the copyright management apparatus 104 is provided with a program-identification-information database 1041 for storing program identification information among the program arrangement information input through the arrangement terminal 101, and a copyright-information database 1042 for storing sales history information generated according to the copyright information input through the copyright-information input terminal 103 and a report from the customer management center 6.

The program identification information stored in the program-identification-information database 1041 includes a service ID, an event ID, and a broadcasting time. These information items are grouped as one set, and a number of sets are entered correspondingly to contents IDs.

The copyright-information database 1042 is divided into a master database 1042a and a sales-history database 1042b. The copyright information stored in the master database 1042a includes the name of a creator, a sales price, and a copyright fee ratio. These information items are grouped as one set, and a number of sets are entered corresponding to contents IDs. The copyright information stored in the sales-history database 1042b includes a sales count (the number of times downloading is performed), a sales money, and a copyright-fee payment money. These information items are grouped as one set, and a number of sets are entered correspondingly to contents IDs. Sales counts are recorded according to the ages and the genders of the users.

The copyright management apparatus 104 also includes a central processing unit (CPU) 1043 for controlling the whole copyright management apparatus 104, a read only memory (ROM) 1044 for storing basic programs which the CPU 1043 executes, a random access memory (RAM) 1045 serving as a work memory for the CPU 1043, a hard disk apparatus (HDD) 1046 for storing basic programs such as an operating system, a floppy disk apparatus 1047 for reading data from and writing data to a floppy disk, a LAN I/F 1048 for connecting to the local area network 112, and a bus 1049.

Referring back to FIG. 1, the ground station 2 has a function of digital satellite broadcasting. It applies processing such as multiplexing and enciphering to program materials and various control information sent from each server in the distribution apparatus 1, and transmits them toward the satellite 3 with the use of a digital-satellite-broadcasting radio wave. More specifically, the ground station 2 receives the TV-program-material data (video data and audio data) sent from the TV-program-material server 106, the musical-piece-material data (audio data) for a plurality of audio channels sent from the musical-piece-material server 107, the additional audio information sent from the additional-audio-information server 108, the GUI data sent from the GUI-data server 109, the individual information enciphered by the enciphering apparatus 105, and the program identification information sent from the program-identification-information database 1041 in the copyright management apparatus 104, applies compression to the data or enciphering processing by the use of a predetermined enciphering key to a part thereof, multiplexes the data, and transmits the data.

Among the TV-program-material data sent from the ground station 2, video data is compressed, for example, according to the moving picture experts group method, MPEG-2. Among the TV-program-material data, audio data is compressed, for example, in the MPEG-2 audio method. Musical-piece-material data (audio data) in each audio channel sent from the ground station 2 is compressed in two different methods, for example, in the MPEG-2 audio method and the adaptive transform acoustic coding (ATRAC) method.

A communication satellite (CS) with a plurality of transponders is, for example, used as the satellite 3. A transponder is a relay apparatus having a function in which a signal is received from the ground station 2, processing such as amplification and frequency conversion is applied to the signal, and then it is re-transmitted toward the ground, and has a transmission capacity of, for example, 30 Mbps.

The receiving facility 4 includes a parabolic antenna 4a, the receiving apparatus 4b called an integrated receiver decoder (IRD), a storage device 4c that can record video data and audio data, and the TV receiver 4d. The parabolic antenna 4a is provided with a frequency converter 4e called a low-noise block downconverter (LNB). With this converter, the received signal is converted to a signal having a predetermined frequency and is sent to the receiving apparatus 4b.

The receiving apparatus 4b selects the signal of a given channel from the received signals to demodulate video data and audio data. The receiving apparatus 4b also generates a list page of distributed musical pieces, an information page of each musical piece, and an EPG screen and sends them to the TV receiver 4d. The receiving apparatus 4b is connected to the customer management computer 6a in the customer management center 6 through, for example, the telephone line 5. As described later, an IC card (not shown) that can store various information is inserted into the receiving apparatus 4b. When the audio data of a musical piece is downloaded (recorded into the storage device 4c), this event is stored in the IC card as downloading information. The information stored in the IC card is periodically sent to the customer management computer 6a in the customer management center 6 through the telephone line 5. The IC card is delivered after the individual key Km of each subscriber and an IC-card ID are recorded. The individual key Km is used in descrambling (decoding) processing at downloading. The IC-card ID is used for accounting processing. Detailed structures and operations of the receiving apparatus 4b and the IC card will be described later.

The storage device 4c stores the audio data of a downloaded musical piece. A Mini Disk (MD) apparatus, a digital audio tape (DAT) apparatus, or a digital video disk (DVD) apparatus is, for example, used as the storage device 4c. A hard disk or a CD recordable (CD-R) drive provided for a personal computer can also be used as the storage device 4c.

An MD apparatus conforming to a communication standard called IEEE-1394 is, for example, used as the storage device 4c in the present embodiment. The IEEE-1394 standard is a bidirectional-serial-interface standard that enables high-speed data transfer, and is also employed as a data communication standard between personal computers and digital video cameras. Since the receiving apparatus 4b and the storage device 4c are connected with the IEEE-1394-standard interface, the audio data of a musical piece selected by the receiving apparatus 4b, still-picture data such as that for the jacket of a CD in which the musical piece is recorded and sold, and text data such as that of the lyrics and artist information can be transmitted to the storage device 4c at a high speed and stored as in the received signal form. A detailed structure of the storage device 4c will be described later.

In the receiving facility 4 configured as described above at a subscriber's house, a music program and a musical piece attached thereto can be watched and listened to by the use of the TV receiver 4d by receiving digital satellite broadcasts sent from the distribution apparatus 1 through the ground station 2 and the satellite 3. Specifically, a GUI screen such as that shown in FIG. 10, described later, is displayed on the TV receiver 4d according to the sent GUI data, and the audience can perform a certain operation while viewing the GUI screen, to see an information page related to each musical piece, to test-listen to each musical piece, or to download the audio data of the desired musical piece to store it in the storage device 4c.

The customer management center 6 is provided with the customer management computer 6a and the customer-information database 6b. The customer management computer 6a performs appropriate accounting processing according to downloading information (purchase information) sent from the receiving apparatus 4b at the house of each subscriber, bills the subscriber a viewing fee, and reports the downloading condition of each musical piece to the distribution apparatus 1. The customer-information database 6b stores customer information unique to each customer. The customer information includes a customer ID, an IC-card ID, an address, and a telephone number. The IC-card ID is an ID unique to each IC card inserted into the receiving apparatus 4b at a subscriber's house, as described above. The downloading condition of each musical piece is reported to the distribution apparatus 1 to allow a copyright fee appropriate for the number of times a distributed musical piece is used to be paid to the copyright holder, as described later.

Figure 3:
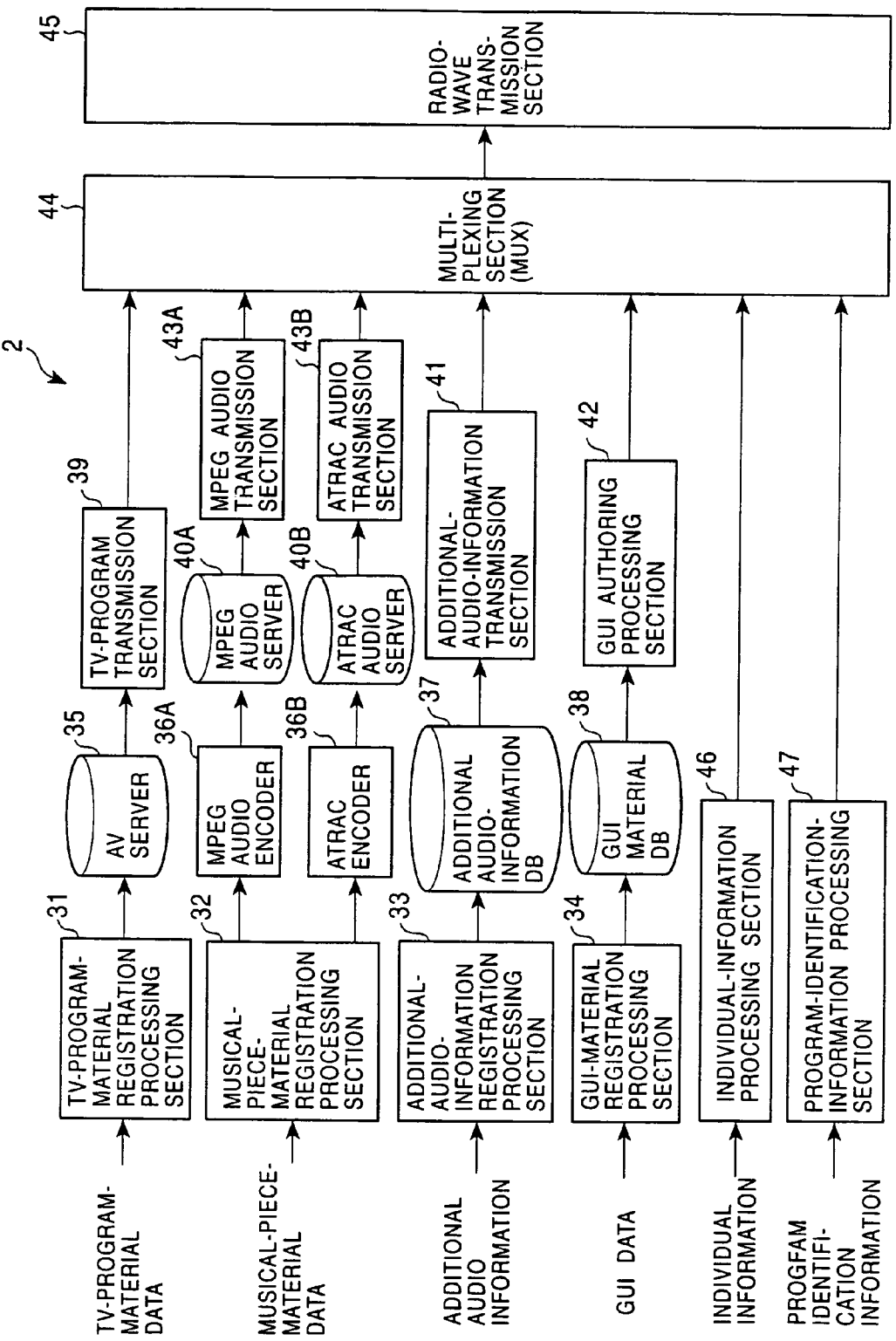
FIG. 3 is a block diagram showing an example structure of a ground station shown in FIG. 1.

FIG. 3 shows a structure of the ground station 2 shown in FIG. 1. As shown in this figure, the ground station 2 is provided with a TV-program-material registration processing section 31 for performing registration processing of TV-program-material data (video data and audio data) sent from the TV-program-material server 106 in the distribution apparatus 1, a musical-piece-material registration processing section 32 for performing registration processing of musical-piece-material data (audio data) sent from the musical-piece-material server 107, an additional-audio-information registration processing section 33 for performing registration processing of additional audio information sent from the additional-audio-information server 108, and a GUI-material registration processing section 34 for performing registration processing of GUI data sent from the GUI-data server 109.

The ground station 2 is further provided with an audio-visual (AV) server 35 for holding TV-program-material data sent from the TV-program-material registration processing section 31, and a TV-program transmission section 39 for compressing, packetizing, and transmitting material data held by the AV server 35.

The ground station 2 is also provided with an MPEG audio encoder 36A for encoding audio data sent from the musical-piece-material registration processing section 32 by the MPEG-2 audio method, an MPEG audio server 40A for holding MPEG audio data obtained by encoding in the MPEG audio encoder 36A, and an MPEG audio transmission section 43A for packetizing and transmitting the MPEG audio data held in the MPEG audio server 40A.

The ground station 2 is also provided with an ATRAC encoder 36B for encoding audio data sent from the musical-piece-material registration processing section 32 by the ATRAC method, an ATRAC audio server 40B for holding ATRAC data obtained by encoding in the ATRAC encoder 36B, and an ATRAC audio transmission section 43B for packetizing and transmitting the ATRAC audio data held in the ATRAC audio server 40B.

The ground station 2 is also provided with an additional-audio-information database 37 for holding additional audio information sent from the additional-audio-information registration section 33, and an additional-audio-information transmission section 41 for packetizing and transmitting the additional audio information held in the additional-audio-information database 37.

The ground station 2 is also provided with a GUI-material database 38 for holding GUI data sent from the GUI-material registration processing section 34, and a GUI authoring processing section 42 for authoring, packetizing, and transmitting the GUI data held by the GUI-material database 38.

The ground station 2 is also provided with an individual-information processing section 46 for processing individual information sent from the copyright management apparatus 104 in the distribution apparatus 1, and a program-identification-information processing section 47 for processing program identification information sent from the copyright management apparatus 104 in the distribution apparatus 1.

The ground station 2 is also provided with a multiplexing section 44 for applying enciphering processing using predetermined enciphering key information to each data and a part of information sent from the transmission sections 39, 43A, 43B, and 41, the GUI authoring processing section 42, the individual-information processing section 46, and the program-identification-information processing section 47, and a radio-wave transmission section 45 for applying a predetermined processing to the output of the multiplexing section 44 and then for transmitting it from an antenna (not shown) toward the satellite 3.

In the ground station 2, configured as described above, TV-program-material data sent from the TV-program-material registration processing section 31 is written into the AV server 35. The material data includes video data and audio data. The material data written into the AV server 35 is sent to the TV-program transmission section 39. The video data is compressed there, for example, by the MPEG-2 method and the audio data is compressed, for example, by the MPEG-2 audio method, and then packetized. The output of the TV-program transmission section 39 is sent to the multiplexing section 44.

The musical-piece-material data sent from the musical-piece-material registration processing section 32, which is audio data, is sent to the MPEG-2 audio encoder 36A and the ATRAC encoder 36B, encoded, and then, written into the MPEG audio server 40A and the ATRAC audio server 40B, respectively. The MPEG audio data written into the MPEG audio server 40A is sent to the MPEG audio transmission section 43A, packetized there, and then sent to the multiplexing section 44. The ATRAC data written into the ATRAC audio server 40B is sent to the ATRAC audio transmission section 43B as quadruple-speed ATRAC data, packetized there, and then sent to the multiplexing section 44.

The additional audio information sent from the additional-audio-information registration processing section 33 is written into the additional-audio-information database 37. The additional audio information written into the additional-audio-information database 37 is sent to the additional-audio-information transmission section 41, packetized there, and then sent to the multiplexing section 44.

The GUI data sent from the GUI-material registration processing section 34 is written into the GUI-material database 38. The GUI data written into the GUI-material database 38 is sent to the GUI authoring processing section 42. GUI screen data is processed, packetized, and then sent to the multiplexing section 44. The GUI data includes the still-picture information of a jacket, the information of the lyrics of a musical piece, and concert information of an artist. The still-picture information is, for example, image data having 640 by 480 pixels compressed by the joint photographic experts group (JPEG) method, and is packetized. The lyrics information is, for example, text data of 800 characters or less, and is packetized.

The individual information input to the individual-information processing section 46 is packetized there and sent to the multiplexing section 44. The program identification information input to the program-identification-information processing section 47 is packetized there, and sent to the multiplexing section 44.

The multiplexing section 44 multiplexes in the time domain the video packet and the audio packet sent from the TV-program transmission section 39, the audio packet sent from the MPEG audio transmission section 43A, the quadruple-speed audio packet sent from the ATRAC audio transmission section 43B, the additional-audio-information packet sent from the additional-audio-information transmission section 41, the GUI data packet sent from the GUI authoring processing section 42, the individual-information packet sent from the individual-information processing section 46, and the program-identification-information packet sent from the program-identification-information processing section 47. At that time, they are also enciphered by the use of key information sent from the enciphering apparatus 105 (FIG. 1). In this case, as described later, the MPEG audio packet, the quadruple-speed ATRAC audio packet and the program-identification-information packet are first enciphered by a predetermined enciphering key and then multiplexed.

The output of the multiplexing section 44 is sent to a radio-wave transmission section 45. An error correcting code is added, processing such as modulation and frequency conversion is applied, and then the result is transmitted from an antenna (not shown) toward the satellite 3.

Figure 4:
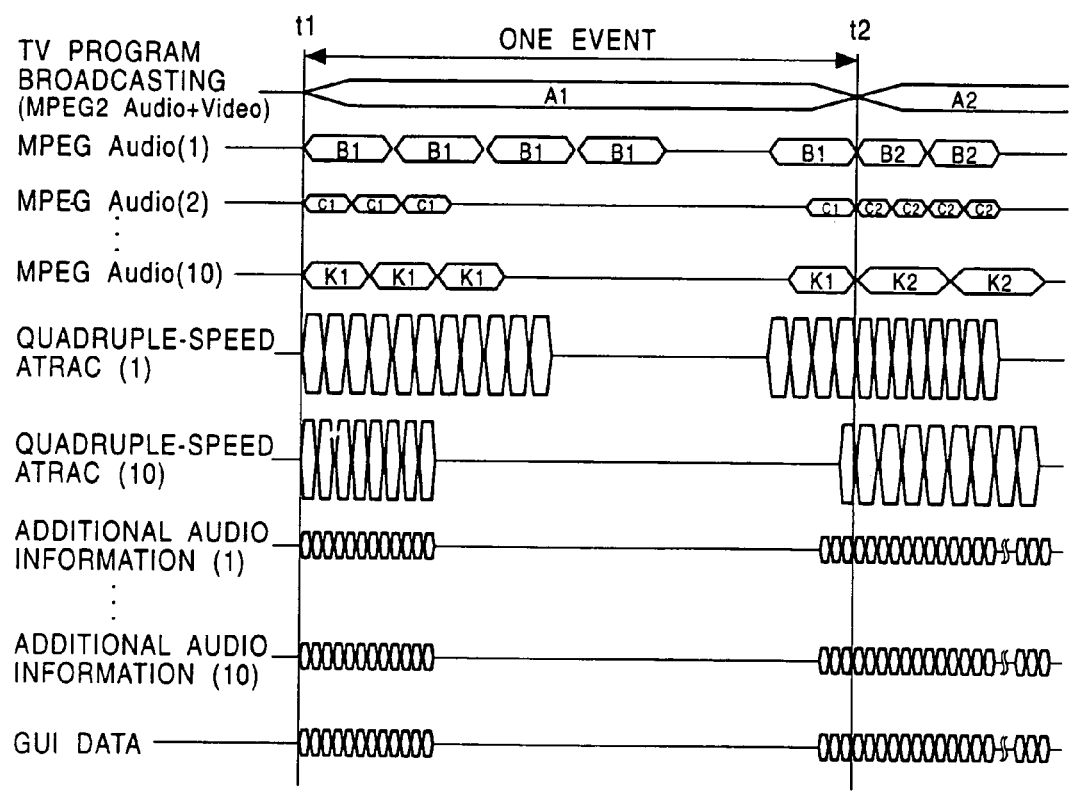
FIG. 4 is a view showing the structure of an example of data distributed in the musical-piece distribution-and-receiving system shown in FIG. 1.

FIG. 4 shows examples of data transmitted from the ground station 2. Each data shown in the figure is actually multiplexed in the time domain. As shown in FIG. 4, a period from a time t1 to a time t2 corresponds to one event, and the next event starts at the time t2. An event refers to a time unit for which a certain musical-piece line-up is used, and is usually set to 30 minutes or one hour. For example, the eleventh to the twentieth songs in the latest top 20 hit songs are broadcasted in an event, and the first to the tenth songs are broadcasted in the following event.

As shown in FIG. 4, in the event from the time t1 to the time t2, a music program having predetermined contents A1 is broadcasted with a usual moving picture. In the event starting at the time t2, a music program having predetermined contents A2 is broadcasted. A moving picture and sound are also transmitted in this usual music program.

Ten channels, for example, from a channel CH1 to a channel CH10 are assigned to audio channels. In each of the audio channels CH1, CH2, CH3, . . . , and CH10, a certain musical piece is repeatedly transmitted during one event. Specifically, in the event from the time t1 to the time t2, a musical piece B1 is repeatedly transmitted through the audio channel CH1, a musical piece C1 is repeatedly transmitted through the audio channel CH2, the same condition is applied to other channels, and a musical piece K1 is repeatedly transmitted through the audio channel CH10. In the event starting at the time t2, a musical piece B2 is repeatedly transmitted through the audio channel CH1, a musical piece C2 is repeatedly transmitted through the audio channel CH2, the same condition is applied to other channels, and a musical piece K2 is repeatedly transmitted through the audio channel CH10. Such repeated transmission processing is also applied to the other MPEG audio channels and the quadruple-speed ATRAC audio channels.

In FIG. 4, the same musical piece is transmitted through a MPEG audio channel and a quadruple-speed ATRAC audio channel having the same channel number, which is written as a number in parentheses. Additional audio information is added to the audio data having the same channel number as the additional audio data, which is written as a number in parentheses. Moving-picture data and text data to be transmitted as GUI data are also generated for each channel.

In FIG. 4, an individual information packet or a program-identification-information packet is not shown. These information packets are also repeatedly transmitted in the same way as for the above audio channels.

Figure 5:
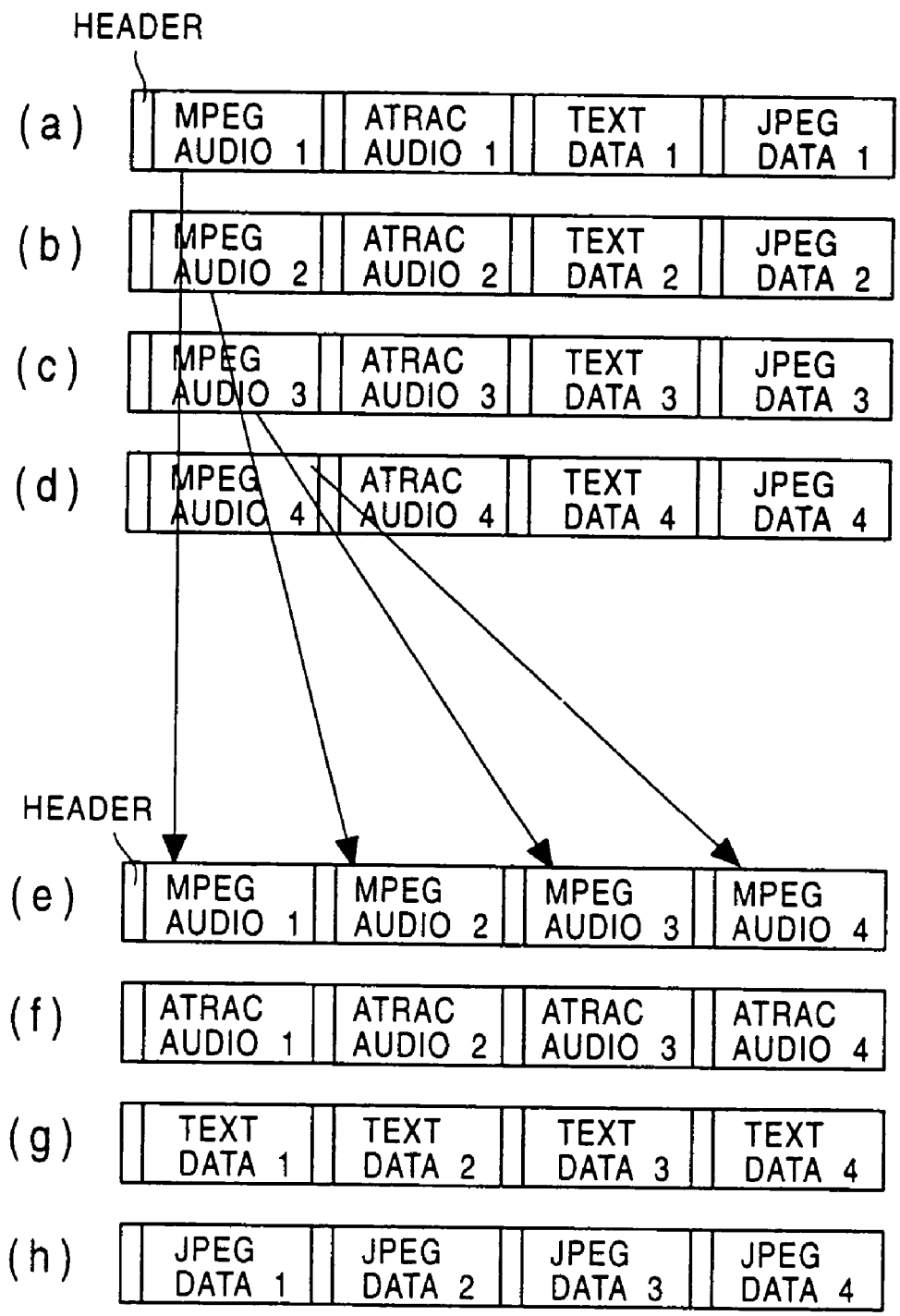
FIG. 5 is a view showing a condition in which data distributed in the musical-piece distribution-and-receiving system shown in FIG. 1 is multiplexed and restructured.

FIG. 5 shows a transmission method and a restructuring method for various types of data such as those shown in FIG. 4. As shown in FIG. 5, rows (a) to (d) show the various types of data time-division-multiplexed and transmitted by MPEG-2 transport packets. Each transport packet has a header, in which information indicating the type of a packet is written. The receiving apparatus 4b restructures each data, as shown in FIG. 5, rows (e) to (h), with the use of the information indicating the type of each packet written in the header.

The receiving apparatus 4b in the receiving facility 4 at a subscriber's house, as shown in FIG. 1, will be described below.

Figure 6:
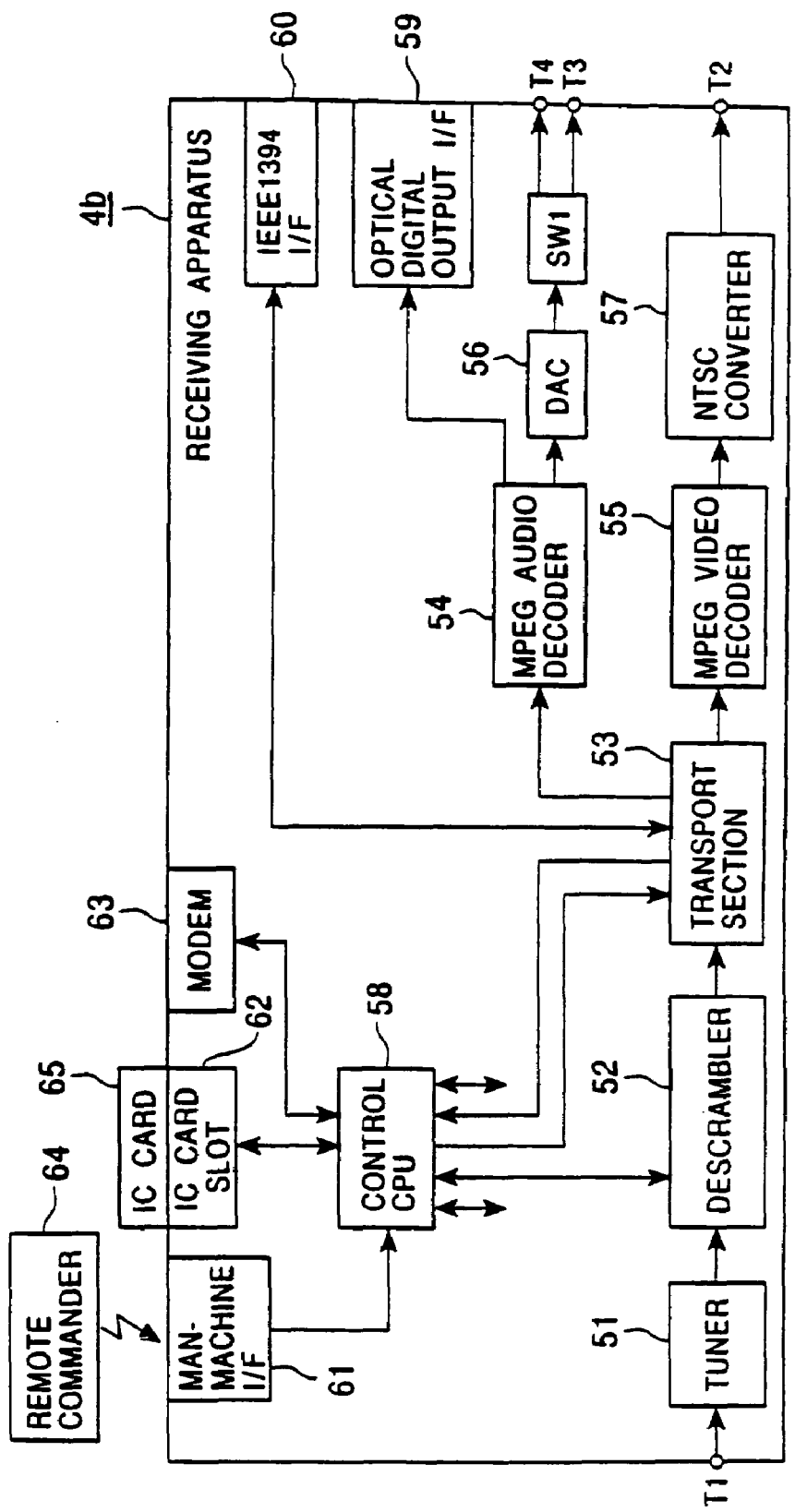
FIG. 6 is a block diagram showing an example structure of a receiving apparatus shown in FIG. 1.

FIG. 6 shows an example structure of the receiving apparatus 4b shown in FIG. 1. As shown in the figure, the receiving apparatus 4b is provided, as external terminals and interfaces, with an input terminal T1, an analog video output terminal T2, analog audio output terminals T3 and T4, an optical digital output interface 59, an IEEE-1394 interface 60, a man-machine interface 61, an IC card slot 62, and a modem 63. The receiving apparatus 4b also includes a control CPU (central processing unit) 58.

The received signal in which the frequency has been converted to a predetermined frequency by the frequency converter 4e of the parabolic antenna 4a is input to the input terminal T1. An analog video signal is sent to the TV receiver 4d through the analog video output terminal T2. An analog audio signal is sent to the TV receiver 4d through the analog audio output terminal T3, and it is sent to a storage device having an analog input, through the analog audio output terminal T4. The optical digital output interface 59 conforms to the IEC-958 standard, and is used for transmitting PCM audio data to an optical-fiber cable. The IEEE-1394 interface 60 is used for transmitting video data, audio data, and various commands to a signal cable conforming to the IEEE-1394 standard. The man-machine interface 61 is used for transmitting an input of the user from a remote commander 64 to the control CPU 58. An IC card 65 is inserted into the IC-card slot 62. The modem 63 is connected to the customer management computer 6a in the customer management center 6 through the telephone line 5.

The receiving apparatus 4b is further provided with a tuner 51 connected to the input terminal T1, a descrambler 52 provided at the subsequent stage of the tuner 51, a transport section 53 provided at the subsequent stage of the descrambler 52, an MPEG audio decoder 54 and an MPEG video decoder 55 provided at the subsequent stage of the transport section 53, a digital-to-analog converter (DAC) 56 provided at the subsequent stage of the MPEG audio decoder 54, a switch SW1 having one input and two outputs provided at the subsequent stage of the MPEG audio decoder 54, and an NTSC converter 57 provided at the subsequent stage of the MPEG video decoder 55.

The output end of the NTSC converter 57 is connected to the analog video output terminal T2. The output terminals of the switch SW1 are connected to the corresponding analog audio output terminals T3 and T4. The MPEG audio decoder 54 is also connected to the optical digital output interface 59. The transport section 53 is also connected to the IEEE-1394 interface 60.

The tuner 51 selects a signal having a predetermined receiving frequency among received signals sent through the terminal T1 according to a setting signal sent from the control CPU 58, applies demodulation processing and error correcting processing, and outputs an MPEG transport stream. The descrambler 52 receives the MPEG transport stream from the tuner 51, receives a key data (individual key Km) for descrambling stored in the IC card 65, through the IC-card slot 62 and the control CPU 58, and performs descrambling by the use of the key data. The descrambler 52 also descrambles a received individual information packet to extract the individual information. The individual information includes an IC-card ID, the number of a work key Kw, and contract information indicating the contents of a receiving contract. The contract information includes a contract service ID indicating a channel for which a viewing contract has been made, a contract event ID indicating a program for which the viewing contract has been made, a contract type showing whether the desired musical piece can be downloaded, a program-purchase upper limit, a designated calling time, and a designated calling fee. The descrambler 52 verifies the IC-card ID included in the extracted individual information with the IC-card ID recorded in the IC card 65. When they match, the descrambler determines that the destination of the individual information packet is correct, and updates the contents of the IC card 65 according to the received individual information. This individual information is not always sent, but is sent only when the subscriber wants to change the contents of the contract or in other cases. The descrambler 52 also descrambles the received program-identification-information packet to extract a service ID and an event ID, and records them into the IC card 65 as purchase record data. The operation of the descrambler 52 will be further described in detail by referring to FIG. 13 later. The transport section 53 receives an instruction which the user inputs through the remote commander 64 through the man-machine interface 61 and the control CPU 58 to extract the MPEG video data and the MPEG audio data of the desired TV program in a transport stream. The MPEG video decoder 55 converts the MPEG video data sent from the transport section 53 back to the video data used before data compression. The MPEG audio decoder 54 converts the MPEG audio data sent from the transport section 53 back to the audio data (PCM audio data) used before data compression. The digital-to-analog converter 56 converts the audio data sent from the MPEG audio decoder 54A to an analog audio signal. The switch SW1 selectively outputs the analog audio signal sent from the digital-to-analog converter 56 to the analog audio output terminal T3 or T4. The NTSC converter 57 converts the video data decoded by the MPEG video decoder 55 to an NTSC composite video signal.

The control CPU 58 performs processing for the whole receiving apparatus 4b. The control CPU 58 also receives an instruction which the user inputs to the receiving apparatus 4b by the use of the remote commander 64, through the man-machine interface 61. The control CPU 58 is connected to the modem 63. Information required for accounting is stored in a predetermined storage area of a non-volatile memory (not shown) in the IC card 65. The information of the IC card 65 is sent to the customer management center 6 (FIG. 1) by using the modem 63 through the telephone line 5.

Figure 10:
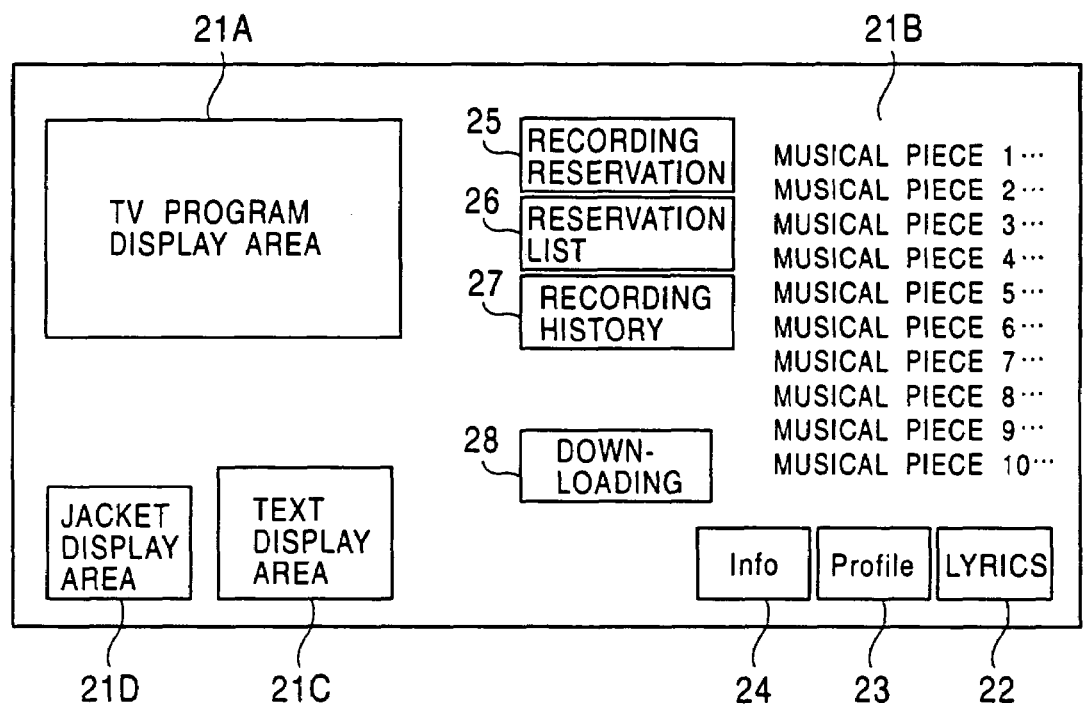
FIG. 10 is a view showing an example of a screen displayed on a TV receiver in the system shown in FIG. 1.

The transport section 53 receives the additional audio information and the GUI data shown in FIG. 4 from a transport stream and sends them to the control CPU 58. The control CPU 58 generates a list page screen, an information page screen for each musical piece, or EPG screen data according to the above data. The screen data generated in this way is written into a predetermined area of a buffer memory in the MPEG video decoder 55. With this, as shown in FIG. 10, the list page of musical pieces to be broadcasted, the information page screen of each musical piece, or the EPG screen can be displayed at a specified area on the display.

FIG. 7 shows connection forms between the receiving apparatus 4b and the storage device 4c. As shown in FIG. 7(a), the receiving apparatus 4b has an analog audio output terminal Aout (terminal T4 in FIG. 6), a digital audio output terminal Dout conforming to IEC-958 or others for sending PCM audio data by an optical cable, and a digital interface terminal Dif conforming to the IEEE-1394 standard or others. Therefore, a storage device having only an analog audio input terminal Ain as shown in FIG. 7(b), a storage device having an audio PCM input terminal Din conforming to IEC-958 or others as shown in FIG. 7(c), or a storage device having a bidirectional digital interface terminal Dif conforming to IEEE-1394 or others can be connected as the storage device 4c.

Figure 7A:
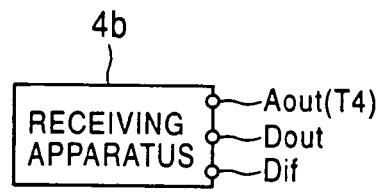
FIG. 7 is a view showing connection forms between a storage device and the receiving apparatus shown in FIG. 1.
Figure 7B:
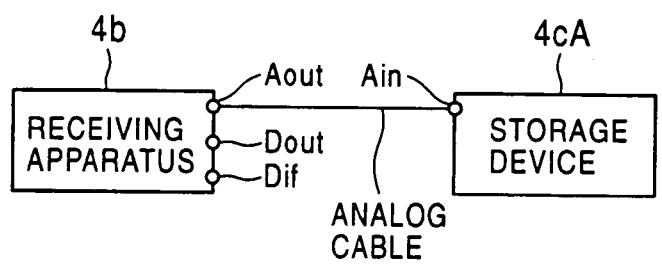

As shown in FIG. 7(b), when a storage device 4cA having only the analog audio input terminal Ain is used as the storage device, the analog output terminal Aout of the receiving apparatus 4b is connected to the analog input terminal Ain of the storage device 4cA with an analog cable.

Figure 7C:
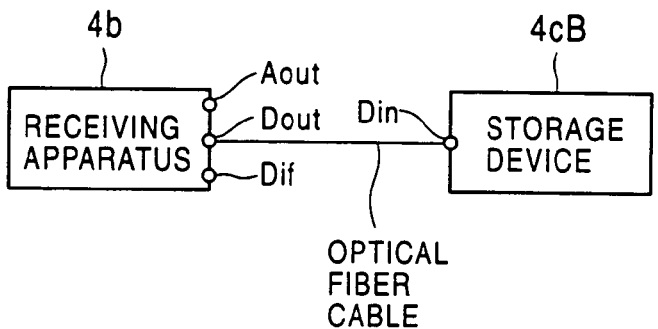

As shown in FIG. 7(c), when a storage device 4cB having the PCM audio input terminal Din conforming to IEC 958 or others is used as the storage device, the digital output terminal Dout of the receiving apparatus 4b is connected to the digital input terminal Din of the storage device 4cB by, for example, an optical fiber cable conforming to IEC-958.

Figure 7D:
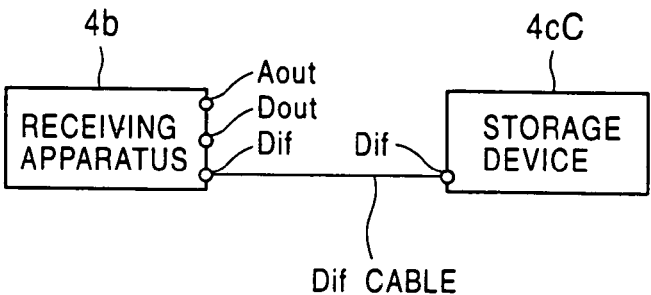

As shown in FIG. 7(d), when a storage device 4cC having the bidirectional digital interface terminal Dif conforming to IEEE-1394 or others is used as the storage device, the digital interface terminal Dif of the receiving apparatus 4b is connected to the digital interface terminal Dif of the storage device 4cC by a digital interface cable conforming to IEEE-1394.

As shown in FIG. 7(b), when a storage device having no digital input terminal is used, downloaded MPEG audio data is MPEG2-decoded in the receiving apparatus 4b, is digital-to-analog converted, and output from the analog audio output terminal Aout. It is sent to the storage device 4cA from the receiving apparatus 4b through an analog cable. In this case, the receiving apparatus 4b and the storage device 4cA may be configured such that control signals are transferred therebetween by wireless communication such as infrared communication or by wire communication with a cable to check connections and downloading operations.

As shown in FIG. 7(c), when the storage device 4cB, which has the PCM audio input terminal Din, is used as a storage device, downloaded MPEG audio data is MPEG2-decoded in the receiving apparatus 4b, and is output from the receiving apparatus 4b as PCM audio data. It is sent to the storage device 4cB from the receiving apparatus 4b through, for example, an optical cable conforming to IEC-958. Also in this case, the receiving apparatus 4b and the storage device 4cB may be configured such that control signals are transferred therebetween by wireless communication such as infrared communication or by wire communication with a cable to check connections and downloading operations.

As shown in FIG. 7(d), when an MD apparatus having a bidirectional digital interface terminal Dif which conforms to IEEE-1394 is used as the storage device 4cC, downloaded quadruple-speed ATRAC data is sent as-is from the receiving apparatus 4b to the storage device 4cC through an IEEE-1394 bus 16C. The MD apparatus serving as the storage device 4cC can store the audio data of the musical piece selected by the receiving apparatus 4b together with its jacket data and text data such as the data of its lyrics.

Therefore, the unit which is used as the storage device 4c can be one of the three types, that is, a unit having an analog input, a unit having an audio-PCM-data input, and a unit having an ATRAC-data input.

Figure 8:
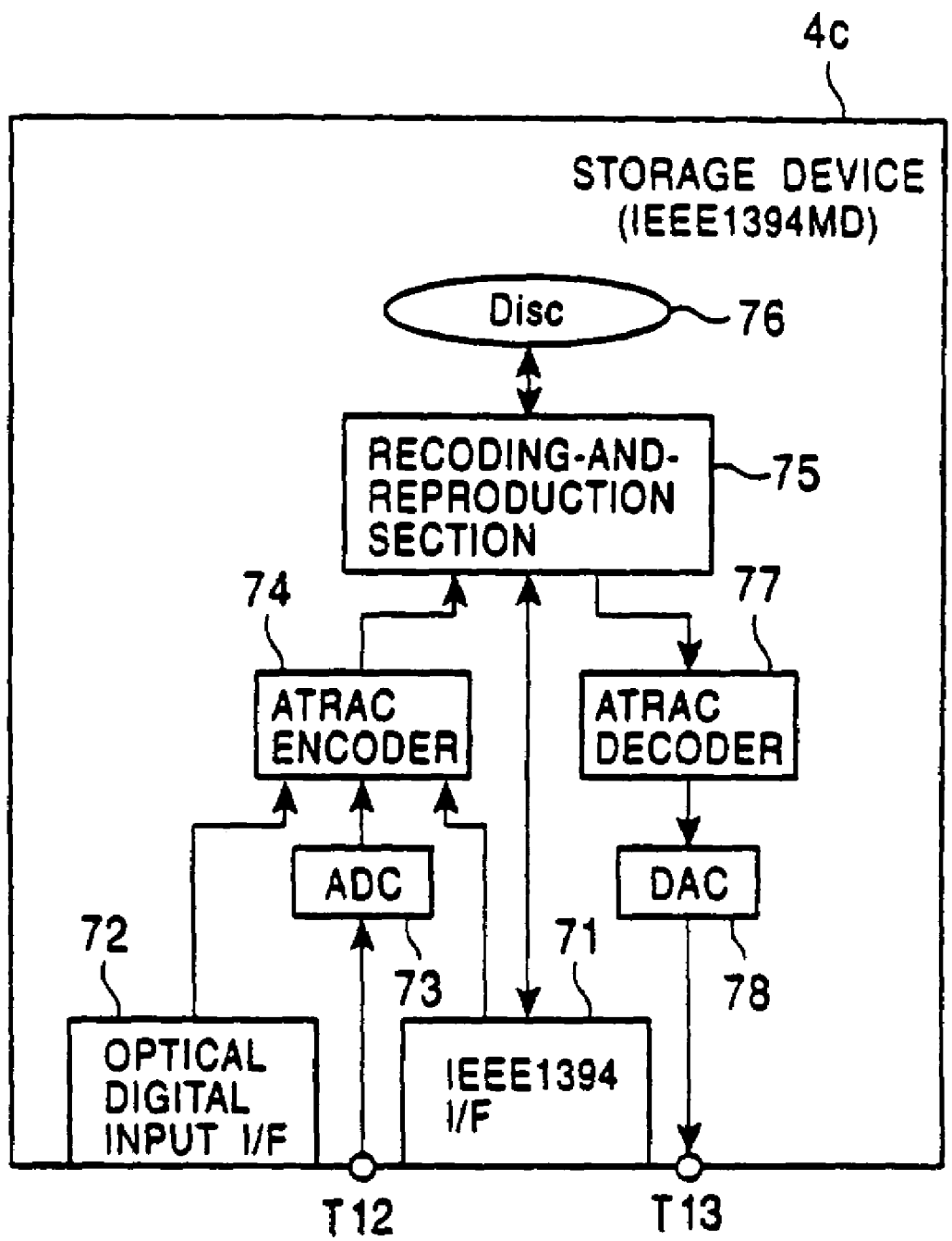
FIG. 8 is a block diagram showing an example structure of the storage device shown in FIG. 1.

FIG. 8 shows an example structure of an MD apparatus conforming to the IEEE-1394 standard, which serves as the storage device 4c shown in FIG. 1. As shown in this figure, the storage device 4c is provided with an IEEE-1394 interface 71, an optical digital input interface 72, an analog audio input terminal T12, and an analog audio output terminal T13. The IEEE-1394 interface 71 is directly connected to a recording-and-reproduction section 75, and is also connected thereto through an ATRAC encoder 74. The optical digital input interface 72 is connected to the recording-and-reproduction section 75 through the ATRAC encoder 74. The analog audio input terminal T12 is connected to the ATRAC encoder 74 through an analog-to-digital converter (ADC) 73. the analog audio output terminal T13 is connected to the recording-and-reproduction section 75 through a digital-to-analog converter (DAC) 78 and an ATRAC decoder 77. A disc 76 is put in the recording-and-reproduction section 75. The recording-and-reproduction section 75 performs recording and reproduction for the disc 76. This MD apparatus, conforming to the IEEE-1394 standard, is also provided with a control CPU for the entire control and a man-machine interface, although they are not shown in the figure.

The operation of the musical-piece distribution-and-receiving system configured as described above will be described below.

The operation of the receiving apparatus 4b, shown in FIG. 6, will be first described.

When the user selects a channel of the musical-piece distribution-and-receiving system, a GUI screen such as that shown in FIG. 10 is displayed on the display of the TV receiver 4d in the receiving apparatus 4b shown in FIG. 6.

A received signal input to the terminal T1 is sent to the tuner 51. The tuner 51 selects a signal having a predetermined receiving frequency among received signals according to a setting signal sent from the control CPU 58, applies demodulation and error correcting processing, and outputs an MPEG transport stream.

The output of the tuner 51 is sent to the descrambler 52. The descrambler 52 receives a key data (individual key Km) for descrambling, stored in the IC card 65, through the IC-card slot 62 and the control CPU 58, and performs descrambling of the MPEG transport stream by the use of the key data. The descrambled MPEG transport stream is sent to the transport section 53.

The transport section 53 receives an instruction which the user inputs through the remote commander 64, through the man-machine interface 61 and the control CPU 58. According to the instruction, the transport section 53 extracts the MPEG video data and the MPEG audio data of the desired TV program from the transport stream, and sends the data to the MPEG video decoder 55 and the MPEG audio decoder 54, respectively.

The MPEG video data sent to the MPEG video decoder 55 is converted back to the video data used before data compression, is converted next in the NTSC converter 57 to a composite video signal, and then is output from the analog video output terminal T2 to the TV receiver 4d. The MPEG audio data sent to the MPEG audio decoder 54 is converted back to the audio data used before data compression, is converted next in the digital-to-analog converter 56 to an analog audio signal, and then is output from the analog audio output terminal T3 to the TV receiver 4d.

When a musical piece is selected from a musical-piece list 21B displayed on the GUI screen shown in FIG. 10 to test-listen to the audio data of the musical piece, the MPEG audio data is extracted by the transport section 53, decoded by the audio decoder 54, digital-to-analog converted by the digital-to-analog converter 56, and output through the switch SW1 from the analog audio output terminal T3 to the TV receiver 4d.

When a downloading button 28 is pressed on the GUI screen shown in FIG. 10 to download the audio data, the audio data is extracted by the transport section 53 and output from one of the analog audio output terminal T4, the optical digital output interface 59, and the IEEE-1394 interface 60.

As shown in FIG. 7(d), when the storage device 4cC, such as an MD apparatus conforming to the IEEE-1394 standard, connected to the IEEE-1394 interface 60 (corresponding to the digital interface terminal Dif in FIG. 7(d)) of the receiving apparatus 4b is used as the storage device 4c, quadruple-speed ATRAC data is extracted by the transport section 53 and sent to the storage device 4c through the IEEE-1394 interface 60. Jacket data compressed by the JPEG method is also extracted by the transport section 53 and sent to the storage device 4c through the IEEE-1394 interface 60 (digital interface terminal Dif). Text data, such as the lyrics of the musical piece and an artist profile, is further extracted by the transport section 53 and sent to the storage device 4c through the IEEE-1394 interface 60.

As shown in FIG. 7(c), when the storage device 4cB having no IEEE-1394 interface, connected to the optical digital output interface 59 (corresponding to the digital output terminal Dout in FIG. 7(c)) of the receiving apparatus 4b is used as the storage device 4c, MPEG audio data is extracted by the transport section 53, is decoded by the MPEG audio decoder 54, and the PCM audio data is sent to the storage device 4cB through the optical digital output interface 59 (digital output terminal Dout).

As shown in FIG. 7(b), when the storage device 4cA having only an analog audio input, connected to the analog audio output terminal T4 (audio output terminal Aout) of the receiving apparatus 4b is used as the storage device 4c, MPEG audio data is extracted by the transport section 53, is decoded by the MPEG audio decoder 54, is digital-to-analog converted by the digital-to-analog converter 56, and is sent to the storage device 4cA through the analog audio output terminal T4 (audio output terminal Aout).

A recording operation in the storage device 4c shown in FIG. 8 will be described below. The description is made assuming that the storage device 4cC, such as an MD apparatus conforming to the IEEE-1394 interface, is used as the storage device 4c.

When the IEEE-1394 interface 71 of the storage device 4c is connected to the IEEE-1394 interface 60 of the receiving apparatus 4b shown in FIG. 6, the audio data of a musical piece, text data such as the lyrics of the musical piece, and still-picture data such as that for the jacket which are sent from the IEEE-1394 interface 60 are input through the IEEE-1394 interface 71, and recorded as-is on the disc 76 by the recording-and-reproduction section 75. In this case, each data is recorded on the disc 76 by an extended MD format.

When PCM audio data is externally input to the optical digital input interface 72, the input PCM audio data is encoded by the ATRAC encoder 74 and recorded on the disc 76 by the recording-and-reproduction section 75.

When an analog audio signal is externally input to the analog audio input terminal T12, the input analog audio signal is analog-to-digital converted by the analog-to-digital converter 73, encoded by the ATRAC encoder 74, and recorded on the disc 76 by the recording-and-reproduction section 75.

In other words, only when this storage device 4c is connected to the receiving apparatus 4b by the IEEE-1394 bus, the audio data of the musical piece is recorded together with the data of its lyrics and the still-picture data. When the optical-digital-interface connection or the analog audio input is used, only the audio data is recorded.

This storage device 4c can output a reproduction signal from the IEEE-1394 interface 71 or the analog audio output terminal T13 during reproduction. When the audio data of a musical piece is recorded into the disc 76 together with the data of its lyrics and jacket data, if a reproduction signal is output from the IEEE-1394 interface 71, the musical-piece data is allowed to be output to an audio unit (such as an amplifier) conforming to IEEE-1394, and the data of the lyrics and the jacket data are allowed to be displayed on a display unit conforming to IEEE-1394 or to be printed by a printer conforming to IEEE-1394.

As described above, in the storage device 4c of the present embodiment, the audio data of a musical piece can be recorded and reproduced together with the data of its lyrics and the jacket data.

FIG. 9 shows the extended MD format, which allows the audio data of a musical piece to be recorded and reproduced together with the data of its lyrics and its jacket data. As shown in the figure, the audio data of a musical piece is recorded in a main data area by the ATRAC method, which is the same as in the current MD format. In the extended MD format, the jacket data and the data of the lyrics are recorded in an auxiliary data (AUX data) area of 2.8 megabytes. With the use of the extended MD format, the audio data of a musical piece is recorded and reproduced together with the data of its lyrics and its jacket data. In addition, compatibility with the current MD format is also maintained.

The operation of an audience at the receiving facility 4 will be described next in detail by referring to FIG. 10.

When the above-described music-program broadcast is received at the receiving facility 4 at each subscriber's house, a GUI screen such as that shown in FIG. 10 is displayed on the TV receiver 4d. In a TV-program display area 21A at the upper left section of the screen, a moving picture is displayed according to a music program sent by the TV-program-material server 106 (FIG. 1) in the distribution apparatus 1. At the upper right section of the screen, the musical-piece list 21B of each channel being broadcasted among audio channels, sent by the musical-piece-material server 107 (FIG. 1) in the distribution apparatus 1, is displayed. At the lower left section of the screen, a text display area 21C and a jacket display area 21D for displaying additional musical-piece information sent by the GUI-data server 109 in the distribution apparatus 1 are provided. At the right side of the screen, a lyrics display button 22, a profile display button 23, an information display button 34, a recording reservation button 25, a reservation-list display button 26, a recording history display button 27, and a downloading button 28 are displayed.

The audience looks for an interesting musical piece while viewing the names of musical pieces displayed in the list 21B. When the audience finds an interesting musical piece, the audience operates an arrow key on the remote commander 64 of the receiving apparatus 4b to place the cursor on the musical piece and presses an Enter key on the remote commander 64. With these operations, the audience can test-listen to the musical piece at which the cursor is placed. Since one musical piece is repeatedly broadcasted for a predetermined time period in each audio channel, the channel is switched to the audio channel for the musical piece while the screen of the TV-program display area 21A remains the same, and the musical piece can be listened to. In this situation, the still picture of the CD jacket of the musical piece is displayed at the jacket display area 21D.

When the cursor is moved to the lyrics display button 22 in this situation and the Enter key is pressed (hereinafter an operation of moving the cursor to a button and pressing the Enter key is called pressing the button), the lyrics of the musical piece are displayed in the text display area 21C in synchronization with the audio data. In the same way, when the profile display button 23 or the information display button 24 is pressed, the profile of the artist corresponding to the musical piece or the concert information is displayed in the text display area 21C. In this way, the audience can understand the musical piece currently being distributed and detailed information of each musical piece.

The audience presses the downloading button 28 to buy the musical piece listened to. When the downloading button 28 is pressed, the audio data of the selected musical piece is downloaded and stored in the storage device 4c. Together with the audio data of the musical piece, the data of its lyrics, artist profile information, and the still-picture data of the jacket can be also downloaded. Every time a musical piece is downloaded, the purchase record corresponding to the downloading (more specifically, the corresponding service ID and event ID) is stored in the IC card 65 in the receiving apparatus 4b. The information stored in the IC card 65 is periodically (once a month, for example) uploaded to the customer management center 6. With this, the copyright fee of a downloaded musical piece can be appropriately paid. Musical-piece downloading and uploading will be further described later.

The audience presses the recording reservation button 25 to make a reservation of downloading in advance. When the button 25 is pressed, the GUI screen is changed and a list of musical pieces for which a reservation can be made is displayed on the whole screen. Musical pieces retrieved in hour units, in week units, or in units of genres can be displayed in this list. When the audience selects a musical piece for which a downloading reservation is to be made from this list, the information is registered into the receiving apparatus 4b. To confirm a musical piece for which a downloading reservation has been made, the audience presses the reservation-list display button 26 to display the list of the reserved musical piece on the whole screen. The musical piece reserved in this way is downloaded at the scheduled time and recorded in the storage device 4c.

To confirm the downloaded musical piece, the audience presses the recording history button 27 to display the list of the musical pieces which have been downloaded on the whole screen.

As described above, in the receiving facility 4, a list of musical pieces is displayed on the GUI screen of the TV receiver 4d. When the audience selects a musical piece according to indications on the GUI screen, the audience can listen to the musical piece, and in addition, understand the lyrics of the musical piece and an artist profile. Furthermore, the audience can download a musical piece, reserve downloading, and display a downloading history and a list of the reserved musical pieces on the GUI screen.

Processing performed in the receiving facility 4 when the audience buys a musical piece in an audio channel, namely, musical-piece-downloading processing, will be described next in detail. In this case, a fee for downloading a musical piece in an audio channel is imposed by the IPPV method described above.

When a musical piece is selected from the musical-piece list displayed on the TV receiver 4d and the downloading button 28 is pressed, the control CPU 58 in the receiving apparatus 4b checks the contract type recorded in the non-volatile memory (not shown) in the IC card 65 and determines whether the contract allows an IPPV program (musical piece in this case) to be purchased. When it is determined that the contract does not allow downloading, the control CPU 58 (FIG. 6) disables downloading of the musical piece.

Conversely, when it is determined from the checking of the contract type that the contract allows an IPPV program to be purchased, the control CPU 58 determines whether the current total viewing fee (the total purchase fee) reaches the program purchase upper limit recorded in the non-volatile memory. As a result, when the total viewing fee exceeds the program purchase upper limit, the control CPU 58 disables downloading of a musical piece. The program purchase upper limit is sent from the customer management center 6 through the distribution apparatus 1 as a part of the individual information and is recorded in the non-volatile memory of the IC card 65.

When the total viewing fee is less than the program purchase upper limit, the control CPU 58 writes the service ID and the event ID in the received program identification information into the non-volatile memory of the IC card 65 as viewing history data. The control CPU 58 retrieves IPPV fee data from the received program identification information, adds it to the total viewing fee stored in the non-volatile memory, and writes the result into the non-volatile memory as the new total viewing fee. After these operations, the above-described descrambling processing is performed and the specified musical piece is downloaded.

Processing for uploading the viewing history (purchase record) data stored in the IC card 65 to the customer management center 6 will be described next.

Processing for uploading the viewing history data stored in the IC card 65 to the customer management center 6 through the telephone line 5 is performed when any one of the following three conditions is satisfied.

Condition 1: When the vacant capacity of the viewing-history storage area is equal to or less than a predetermined value in the non-volatile memory of the IC card 65.

Condition 2: When the designated calling time recorded in advance in the non-volatile memory of the IC card 65 is reached.

Condition 3: When the total viewing fee exceeds the designated calling fee recorded in advance in the non-volatile memory of the IC card 65.

The reason why condition 2 and condition 3 are specified is to prevent a subscriber from limitlessly downloading musical pieces when the subscriber disconnects the connection between the receiving apparatus 4b and the telephone line 5. As described above, the designated calling time and the designated calling fee are included in the received individual information. They are extracted from the individual information and recorded into the non-volatile memory of the IC card 65.

When any one of the foregoing conditions is satisfied, the control CPU 58 starts uploading the viewing history data to the customer management center 6. When the uploading processing is completed without an error, the total viewing fee stored in the IC card 65 is reset to zero.

Operation and effect features in the musical-piece distribution-and-receiving system in the present embodiment will be described next.

A processing flowchart regarding copyright management for a musical piece to be distributed in the system will be described first by referring to FIG. 11 and FIG. 12.

Figure 11:
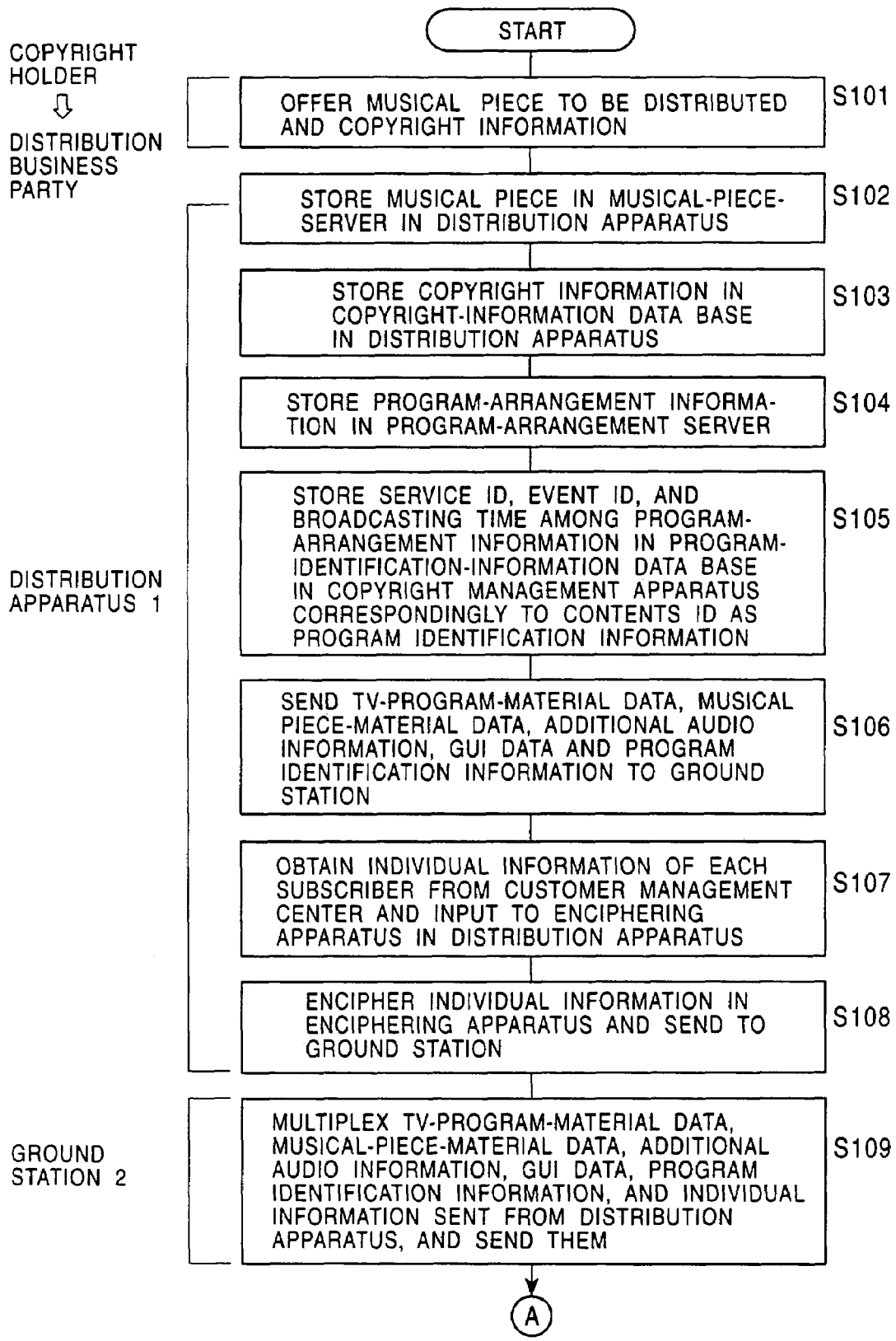
FIG. 11 is a flowchart showing a flowchart of a process related to copyright management of a musical piece distributed in the musical-piece distribution-and-receiving system shown in FIG. 1.
Figure 12:
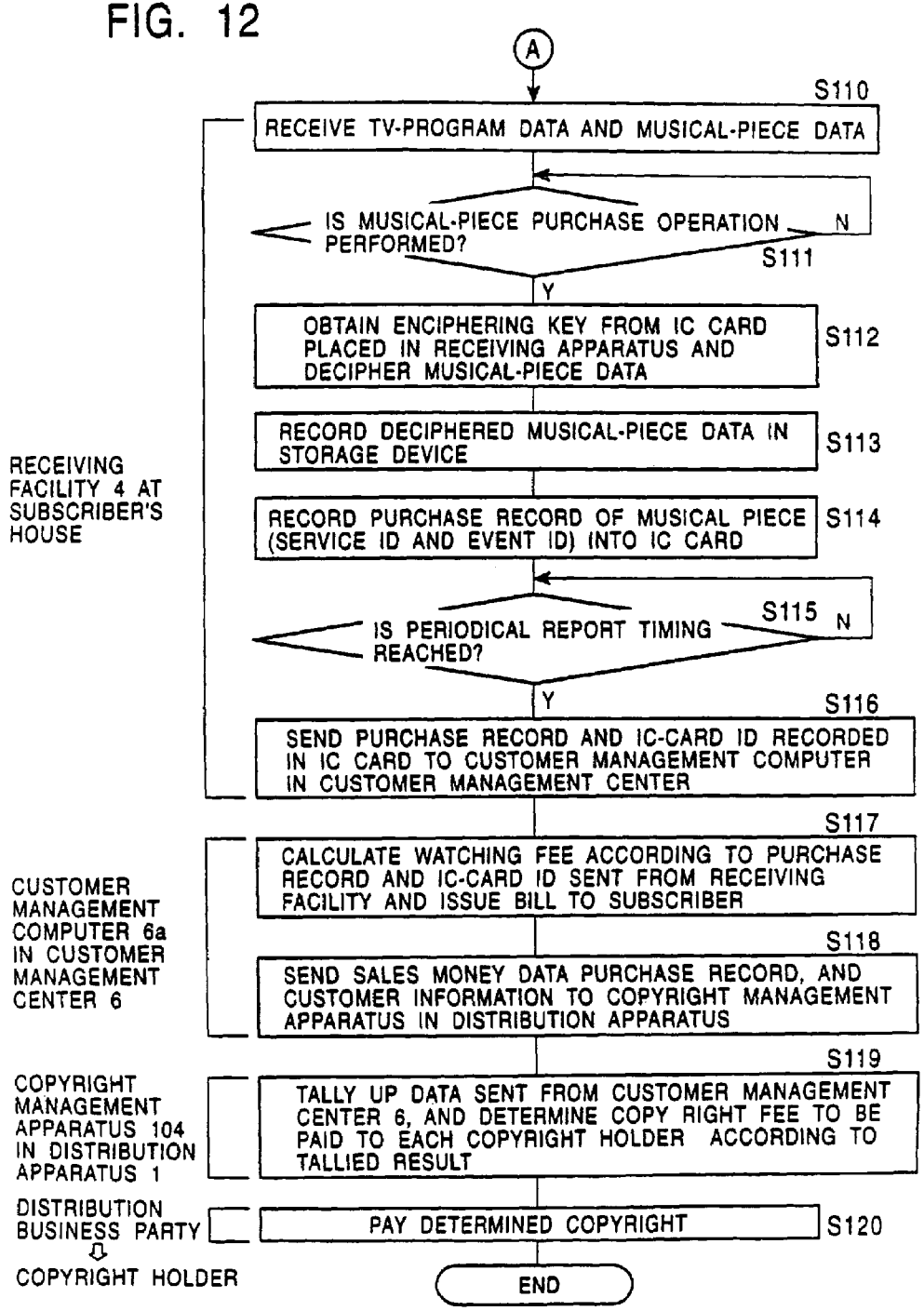
FIG. 12 is a flowchart following that of FIG. 11.

A copyright holder C offers a musical piece, for which a fee is imposed by the IPPV method, and the copyright information of the musical piece in a step S101 in FIG. 11. The musical piece is submitted, for example, in the form of a CD. The distribution business party inputs the musical piece submitted from the copyright holder C at the musical-piece input terminal 102 in the distribution apparatus 1 to store it in the musical-piece-material server 107 in the distribution apparatus 1 in a step S102. The distribution business party also inputs the copyright information submitted from the copyright holder C at the copyright-information input terminal 103 in the distribution apparatus 1 to store it in the copyright-information database 1042 in the distribution apparatus 1 in a step S103. Copyright information stored in this copyright-information database 1042 includes the contents ID of a musical piece, the names of the copyright holders (such as the names of the composer and the songwriter of the musical piece), the sales price of the musical piece, and the copyright fee ratio.

The distribution business party determines a TV program, a musical piece, and the time when these are to be broadcasted, and inputs the information at the program-arrangement terminal 101 as program-arrangement information. The input program-arrangement information is stored in the program-arrangement server 111 in a step S104. As described previously, the program-arrangement information includes the title of the TV program, an event ID which is identification information unique to the program, the broadcasting time, the titles of a plurality of musical pieces to be distributed along with the TV program, the contents ID of each musical piece, a service ID indicating the sub-channel (audio-channel) assignment of each musical piece, and musical-piece-accompaniment information added to each musical piece. The musical-piece-accompaniment information includes the artist who performs (or sings) a musical piece, the songwriter, the composer, the jacket image and the release date of a CD which includes the musical piece, and concert information related to the artist. Among the program-arrangement information, the service ID, the event ID and the broadcasting time are stored in the program-identification-information database 1041 in the copyright management apparatus 104 correspondingly to the contents ID, as program identification information in a step S105.

When the specified broadcasting time arrives, the TV-program data, the musical-piece data, the additional audio information, and the GUI data are read from the TV-program-material server 106, the musical-piece-material server 107, the additional-audio-information server 108, and the GUI-data server 109, respectively, and are sent to the ground station 2. The program identification information is read from the program-identification-information database 1041 and sent to the ground station 2 in a step S106. The individual information of each subscriber is sent from the customer management center 6 to the enciphering apparatus 105 in the distribution apparatus 1 in a step S107. The individual information is enciphered in the enciphering apparatus 105 by using an enciphering key stored in the enciphering-key database 105a and sent to the ground station 2 in a step S108. The ground station 2 time-division-multiplexes the TV-program data, the musical-piece data, the additional audio information, the GUI data, the program-identification information, and the individual information sent from the distribution apparatus 1 and transmits them toward the satellite 3 in a step S109. In this case, the musical-piece data and the program identification information are first enciphered and then multiplexed.

The TV-program data and the musical-piece data sent from the ground station 2 through the satellite 3 are received by the receiving facility 4 of each subscriber's house and reproduced by the TV receiver 4d in a step S110. Because the musical-piece data has been enciphered, the audience cannot decipher the musical-piece data unless the audience performs a purchase operation.

When the audience performs an operation for buying the musical piece (in the case of "Y" in a step S111), the audience obtains a deciphering key (individual key Km) from the IC card 65 placed in the receiving apparatus 4b and is allowed to decipher the musical-piece data in a step S112. The deciphered musical-piece data is recorded in the storage device 4c in a step S113. The service ID and the event ID of the downloaded musical piece are recorded in the IC card 65 as a purchase record (audience record) in a step S114. This purchase record cannot be externally deleted.

When a periodical report timing is reached (in the case of "Y" in a step S115), the purchase record recorded in the IC card 65 is sent to the customer management computer 6a in the customer management center 6 through the telephone line 5 together with the IC-card ID of the IC card 65 in a step S116. The periodical report timing is, for example, set to one month.

The customer management computer 6a in the customer management center 6 refers to the customer-information database 6b according to the purchase record and the IC-card ID sent from each subscriber to perform accounting processing. Specifically, the customer management computer 6a calculates a viewing fee (downloading fee) and issues a bill to the subscriber in a step S117. The viewing fee is calculated with the use of the IC-card ID of each subscriber stored in the customer-information database 6b and the program information (service ID, event ID, broadcasting time, and sales price). The program information has been sent in advance from the copyright management apparatus 104 in the distribution apparatus 1.

The customer management computer 6a in the customer management center 6 sends sales-amount data indicating the same amount of money as the viewing fee billed to the subscriber to the copyright management apparatus 104 in the distribution apparatus 1, and also sends the purchase record (service ID and event ID) and the customer information to the copyright management apparatus 104 in a step S118. The customer information includes the customer ID, the IC-card ID, the address, and the telephone number. The transmission of the customer information may be omitted to protect privacy.

The copyright management apparatus 104 tallies up the data sent from the customer management center 6, and determines a copyright fee for each copyright holder according to the tally result in a step S119. More specifically, the CPU 1043 (FIG. 2) of the copyright management apparatus 104 searches the program-identification-information database 1041 (FIG. 2) according to the service ID and the event ID sent from the customer management center 6 to obtain the corresponding contents ID. The CPU 1043 then searches the master database 1042*a* of the copyright-information database 1042 according to the obtained contents ID to obtain the copyright holder and the copyright-fee ratio. The CPU 1043 calculates a copyright fee from the sales price and the copyright-fee ratio and obtains the cumulative total as the copyright-fee payment corresponding to the contents ID in the sales-history database 1042*b* of the copyright-information database 1042. The CPU 1043 also records the customer information received from the customer management center 6 as the sales record corresponding to the contents ID in the sales-history database 1042*b* of the copyright-information database 1042, and adds the sales money data received from the customer management center 6 to the cumulative sales money total. The sales record is recorded, for example, as a sales count according to the gender and the age of the subscribers.

The distribution business party operating the distribution apparatus 1 pays the copyright holder the copyright fee corresponding to the copyright-fee payment calculated by the copyright management apparatus 104 and stored in the sales-history database 1042*b* in a step S120. The distribution business party can also perform market research of the audience according to the sales record obtained from the customer information obtained from the customer management center 6.

Figure 13:
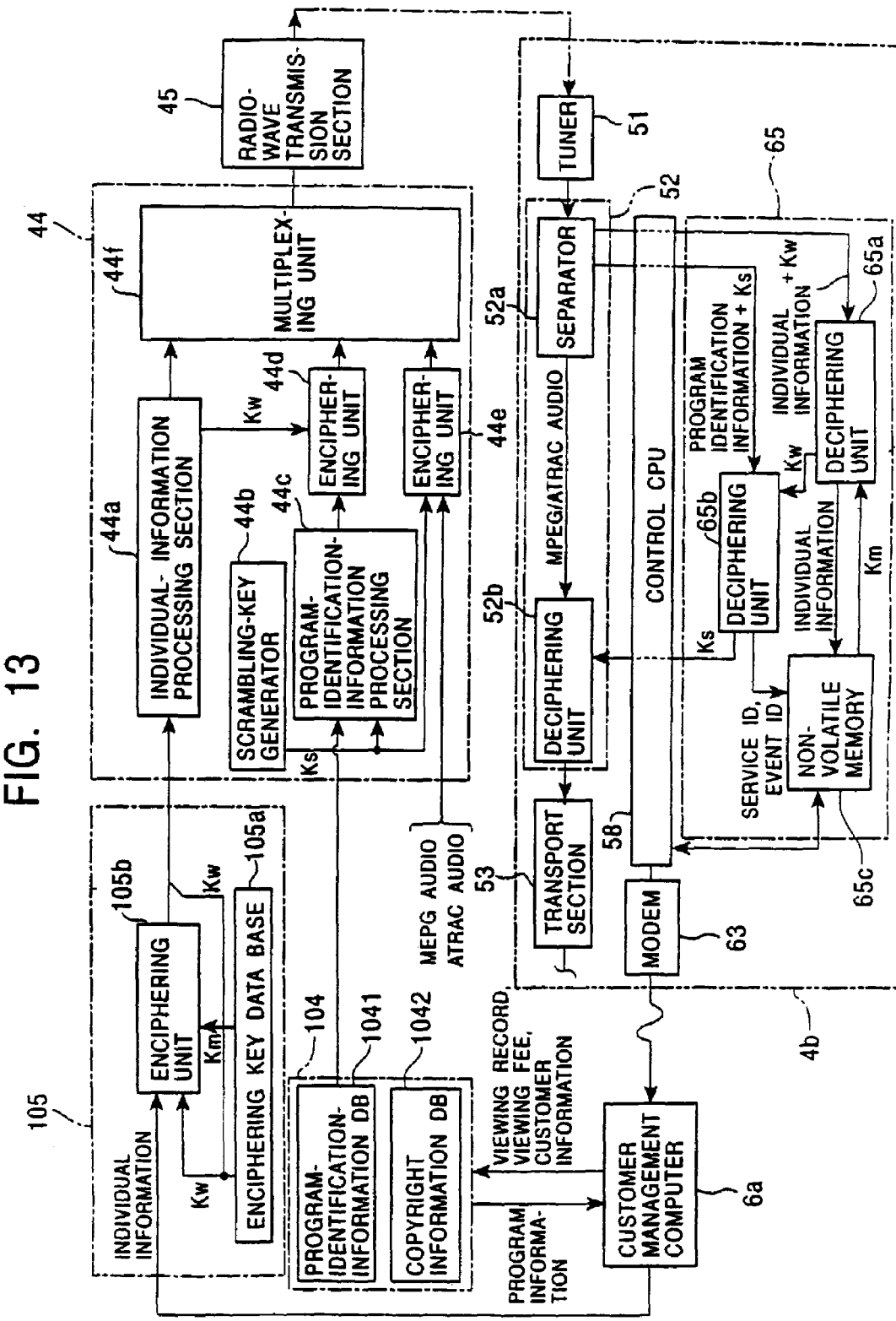
FIG. 13 is a block diagram showing only a main section related to enciphering and deciphering of a musical piece, individual information, and program identification information among information distributed in the musical-piece distribution-and-receiving system shown in FIG. 1.

A processing flow related to enciphering and deciphering of distribution information in the musical-piece distribution and receiving system will be described next by referring to FIG. 13. FIG. 13 shows only a main section related to enciphering and deciphering of a musical piece, individual information, and program-identification information among distribution information in the musical-piece distribution-and-receiving system shown in FIG. 1. Elements not directly related to the enciphering and deciphering are omitted in the figure.

The customer management computer 6*a* in the customer management center 6 sends individual information stored in the customer-information database 6*b* to the enciphering apparatus 105 in the distribution apparatus 1. The individual information input to the enciphering apparatus 105 is input to an enciphering unit 105*b* along with a work key Kw taken out from an enciphering-key database 105*a*. The enciphering unit 105*b* enciphers the individual information and the work key Kw by the use of an individual key Km taken out from the enciphering-key database 105*a*. The enciphering unit 105*b* sends the individual information and the work key Kw enciphered to the multiplexing section (MUX) 44 in the ground station 2. The work key Kw taken out from the enciphering-key database 105*a* is also sent as-is without being enciphered to the multiplexing section (MUX) 44 through a path different from that used above, together with the enciphered individual information and work key Kw.

An individual-information processing section 44*a* in the multiplexing section 44 of the ground station 2 applies processing to the enciphered individual information and work key Kw sent from the enciphering apparatus 105 in the distribution apparatus 1 to make them such that they can be repeatedly transmitted, and inputs them into a multiplexing unit 44*f*. The individual-information processing section 44*a* also extracts the work key Kw sent from the enciphering apparatus 105 without being enciphered and sends it to an enciphering unit 44*d* described later.

The multiplexing section 44 in the ground station 2 receives compressed MPEG audio data and ATRAC audio data from the MPEG audio transmission section 43A and the ATRAC audio transmission section 43B, respectively, disposed in the same ground station 2 shown in FIG. 3. The multiplexing section 44 also receives the program-identification information sent from the program-identification-information database 1041 in the copyright management apparatus 104 of the distribution apparatus 1. Furthermore, the multiplexing section 44 receives the MPEG video data and the MPEG audio data from the TV-program transmission section 39 shown in FIG. 3, the additional audio information from the additional-audio-information transmission section 41, and the GUI data from the authoring section 42, but they are omitted in FIG. 13.

A program-identification-information processing section 44*c* in the multiplexing section 44 applies processing to the program identification information sent from the program-identification-information database 1041 in the copyright management apparatus 104 of the distribution apparatus 1 and a scrambling key Ks generated in a scrambling-key generator 44*b* to make them such that they can be repeatedly transmitted, and sends them to the multiplexing unit 44*f*.

An enciphering unit 44*e* applies scrambling processing to the compressed MPEG audio data and ATRAC audio data with the use of the scrambling key Ks sent from the scrambling-key generator 44*b*, and inputs them to the multiplexing unit 44*f*.

The multiplexing unit 44*f* time-division-multiplexes the enciphered individual information and work key Kw sent from the individual-information processing section 44*a*, the enciphered program identification information and scrambling key Ks sent from the enciphering unit 44*d*, the enciphered MPEG audio data and ATRAC audio data sent from the enciphering unit 44*e*, the TV-program MPEG video data (not shown), the TV-program MPEG audio data (not shown), the additional audio information (not shown), and the GUI data (not shown) to form one data stream, and sends it from the radio-wave transmission section 45.

The data stream transmitted from the radio-wave transmission section 45 in the ground station 2 through the satellite 3 is received by the receiving facility 4 at a subscriber's house, separated to each data by a separator (demultiplexer) 52*a* through the tuner 51 of the receiving apparatus 4*b*, and sent to each section by the control CPU 58.

More specifically, among the separated data, the enciphered individual information and work key Kw are input to a deciphering unit 65*a* in the IC card 65, and deciphered there with the use of the individual key Km taken out from a non-volatile memory 65*c* to obtain the work key Kw.

Among the separated data, the enciphered program identification information and scrambling key Ks are input to a deciphering unit 65*b* in the IC card 65, and deciphered there with the use of the work key Km output from the deciphering unit 65*a* to obtain the scrambling key Ks.

Among the separated data, the enciphered MPEG audio data and ATRAC audio data are input to a deciphering unit 52*b*, and deciphered there with the use of the scrambling key Ks output from the deciphering unit 65*b*, and sent to the transport section 53 shown also in FIG. 6. Since the subsequent processing has been described above, the description thereof will be omitted.

Among the data received by the receiving apparatus 4*b*, the enciphered individual information is deciphered by the deciphering unit 65*a* and the enciphered program identification information is deciphered by the deciphering unit 65*b*. The deciphered individual information and program identification information are stored in a predetermined storage area of the non-volatile memory 65*c*. Among the program identification information stored in the non-volatile memory 65*c* of the IC card 65, the service ID and the event ID are periodically sent to the customer management computer 6a in the customer management center 6 as a purchase record.

As described above, in the musical-piece distribution-and-receiving system of the present embodiment, a music broadcasting program is distributed and the audio data of a musical piece is also distributed by the use of a plurality of audio channels. A subscriber can look for the desired musical piece with the use of a list of distributed musical pieces and easily store its audio data in the storage device 4c.

In addition, in the musical-piece distribution-and-receiving system of the present embodiment, since accounting is performed by the pay-per-view method in which purchases are performed in units of musical pieces, a purchase record is stored in an IC card when a musical piece is purchased, and the stored purchase record is transmitted to the customer management center 6, the distribution business party can correctly determine the person who has purchased the musical piece and perform correct accounting.

Further, in the musical-piece distribution-and-receiving system of the present embodiment, since the copyright management apparatus 104 is disposed in the distribution apparatus 1, and the copyright management apparatus 104 obtains the purchase record of a musical piece from the customer management center 6 to calculate a copyright fee, the copyright fee is appropriately paid to the copyright holder. In addition, since the customer information of the user who has purchased the musical piece is also sent from the customer management center 6 to the copyright management apparatus 104, market-trend research can be performed in real time, such as obtaining artist ranking or musical-piece ranking in each customer layer.

Furthermore, in the musical-piece distribution-and-receiving system of the present embodiment, since the enciphering processing with the use of a plurality of enciphering keys is applied to a distributed musical piece, unauthorized viewing is prevented and system reliability is assured.

Still further, in the musical-piece distribution-and-receiving system of the present embodiment, the receiving apparatus 4b in the receiving facility 4 disposed at a subscriber's house is only required to send the purchase-record data in the IC card to the customer management center 6, and does not need to send it to the distribution apparatus 1. Therefore, when the copyright management function of the present invention is added to an existing musical-piece distribution-and-receiving system, for example, a subscriber does not need to modify an existing receiving facility 4 and the distribution business party only needs to change the distribution apparatus 1 to newly install a copyright management apparatus. In other words, even if such a system change is required, a new burden is not imposed on the subscriber.

The present invention has been described with an embodiment. The present invention is not limited to this embodiment, and can be implemented in various modifications. For example, in the above embodiment, the customer management center 6 for performing customer management is disposed separately from the distribution apparatus 1. The distribution apparatus 1 may have the function of the customer management center 6.

In the present embodiment, the receiving apparatus 4b at the subscriber's house is connected to the customer management center 6 with the telephone line 5. They may be connected with other lines, such as the Internet or an ISDN line.

In the above embodiment, the present invention is applied to the digital satellite broadcasting system. The present invention can be also applied to a system in which a musical piece distributed by terrestrial broadcasting is downloaded, a system in which a musical piece distributed by cable broadcasting is downloaded, or a system in which a musical piece is downloaded through the Internet. The present invention can be applied not only to a case in which musical-piece materials are distributed but also to a case in which the contents of copyrighted work are distributed as data, as in video materials such as movies, and to a system in which other types of copyrighted work are distributed. The present invention can be applied, for example, to an electronic book-distribution system for distributing still pictures and character information such as books, magazines, and newspapers, an electronic magazine subscription system, and an electronic newspaper subscription system.

The invention claimed is:

1. A method for distributing copyrighted works and managing payments owed as a result of the distributing to the owners of the copyrights in the copyrighted works, said method comprising:

distributing from a server located at a distribution facility said copyrighted works through a first transmission system, the copyrighted works being enciphered, comprising musical pieces and being distributed as first digital data packets multiplexed with a broadcasted television program related to the copyrighted works and comprising second digital data packets;

receiving at a receiving facility in communication with the transmission system the first and second digital data packets distributed from the server, the receiving facility comprising a packet selector in communication with a first memory and a monitor, selecting with the packet selector the first digital data packets for transmission to the first memory for storage and the second digital data packets for transmission to the monitor for displaying the television program;

receiving at a communication interface at said distribution facility through a second transmission system a purchasing record identifying selected copyrighted works distributed from the distribution facility and selected by the receiving facility for downloading at the receiving facility and storing in the first memory, said purchasing record being stored in a second memory at the time of said downloading and transmitted to said communication interface after said downloading, said second memory being associated with said receiving facility and also storing, in advance of said selecting of said selected copyrighted works by said receiving facility, authorization data for authorizing the downloading of said selected copyrighted works;

storing in a third memory associated with said server copyright information corresponding to each of said distributed copyrighted works, said information providing the identity of the distributed copyrighted works, the identity of the owners of the copyrights for the distributed copyrighted works, data relating to the costs for downloading the copyrighted works by said receiving facility and the identity of the broadcasted television program;

calculating with a processor associated with said server, in communication with said third memory, based upon said purchasing record and said copyright information, a copyright payment due each owner of the copyrights for the selected copyrighted works.

* * * * *